(12) United States Patent
Faraon et al.

(10) Patent No.: US 11,438,076 B2
(45) Date of Patent: Sep. 6, 2022

(54) OPTICAL QUANTUM NETWORKS WITH RARE-EARTH IONS

(71) Applicant: California Institute of Technology, Pasadena, CA (US)

(72) Inventors: Andrei Faraon, La Canada Flintridge, CA (US); Jonathan M. Kindem, Boulder, CO (US); Andrei Ruskuc, Pasadena, CA (US); John G. Bartholomew, Glebe (AU); Jake Rochman, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 271 days.

(21) Appl. No.: 16/937,379

(22) Filed: Jul. 23, 2020

(65) Prior Publication Data
US 2021/0028863 A1    Jan. 28, 2021

Related U.S. Application Data

(60) Provisional application No. 62/878,976, filed on Jul. 26, 2019.

(51) Int. Cl.
*H04B 10/70* (2013.01)
*B82Y 20/00* (2011.01)
(Continued)

(52) U.S. Cl.
CPC .............. *H04B 10/70* (2013.01); *B82Y 10/00* (2013.01); *B82Y 20/00* (2013.01); *G06N 10/00* (2019.01)

(58) Field of Classification Search
CPC .................... G02F 1/095; G02F 1/0036
See application file for complete search history.

(56) References Cited

U.S. PATENT DOCUMENTS

| 2019/0154439 A1* | 5/2019 | Binder | G01B 11/26 |
| 2019/0205784 A1* | 7/2019 | Monroe | G06E 1/00 |
| 2021/0302767 A1* | 9/2021 | Faraon | G02F 1/095 |

OTHER PUBLICATIONS

Zhong et al., Nanophotonic coherent light-matter interfaces based on rare-earth-doped crystals, Sep. 14, 2015, Nature Communications, DOI:10.1038, pp. 1-6 (Year: 2015).*

(Continued)

*Primary Examiner* — Thomas A Hollweg
*Assistant Examiner* — Mary A El-Shammaa
(74) *Attorney, Agent, or Firm* — Steinfl + Bruno, LLP

(57) ABSTRACT

Systems and methods for providing optical quantum communication networks based on rare-earth ion quantum bits (qubits) entrapped in solids are presented. According to one aspect a qubit is provided by an $^{171}Yb^{3+}$ ion doped into a YVO crystal structure. A nanophotonic cavity fabricated in the doped crystal structure provides a zero-field energy level structure of the ion with optical transitions between ground and excited states at a wavelength longer than 980 nm. A subspace of the qubit is provided by two lower energy levels at the ground states separated by a microwave frequency of about 675 MHz. Addressing of the optical transitions is via first and second lasers and addressing of microwave transitions at the ground and excited states are via respective microwave sources. A single-shot readout sequence of the qubit based on two consecutive readout sequences on the optical transitions separated by a microwave pumping of the ground states is presented. Assignment of a readout state is conditionally based on combined states detected in the two consecutive readout sequences.

23 Claims, 14 Drawing Sheets

(51) Int. Cl.
*B82Y 10/00* (2011.01)
*G06N 10/00* (2022.01)

(56) References Cited

OTHER PUBLICATIONS

Kindem et al., Characterization of 171YB3+:YVO4 for photonic quantum technologies, Jun. 5, 2018, Physical Review, B98, 024404, pp. 1-10 (Year: 2018).*
Kindem et al., Control and single-shot readout of an ion embedded in a nanophotonic cavity, Mar. 30, 2020, Nature, vol. 580, pp. 201-213 (Year: 2020).*
McAuslan et al., Strong-coupling cavity QED using rare-earth-metal-ion dopants in monolithic resonators: What you can do with a weak oscillator, Dec. 3, 2009, Physical Review, A 80 062307, pp. 1-9 (Year: 2009).*
Zhong et al., High quality factor nanophotonic resonators in bulk rare-earth doped crystals, Jan. 7, 2016, Optics Express, vol. 24, No. 1, pp. 536-544 (Year: 2016).*
Walter et al., Rapid High-Fidelity Single-Shot Dispersive Readout of Superconducting Qubits, Jun. 26, 2017, Physical Review Applied, 7, 054020, pp. 1-11 (Year: 2017).*
Jarman, Trapped ytterbium ions could form backbone of a quantum internet, say researchers, physics world, Apr. 13, 2020, pp. 1-2 (Year: 2020).*
Ahlefeldt, R. L., et al., "Ligand isotope structure ofthe optical 7F0→5D0 transition inEuCl3•6H2O,"*Phys. Rev.*B 80,5-9 (Nov. 5, 2009). 6 pages.
Andrews, R. W., et al., "Bidirectional and efficient conversion between microwave and optical light," Nat. Phys. 10, 321-326 (2014). 7 Pages.
Bartholomew et al., "ON-chip coherentmicrowave-to-optical transduction mediated by ytterbium in YVO4" Published in Nature Comm, 11:3266, 2020. + Supplementary Info. 24 Pages.
Chen, Y.-H., et al., "Couplingerbiumspinsto athree-dimensional superconducting cavity at zero magnetic field,"*Phys. Rev. B—Condens. Matter Mater. Phys.*94, 1-5 (2016). 6 Pages.
Cook, E. C., et al., "High passive-stability diode-laser design for use in atomic-physics experiments," Rev.Sci. Instrum 83, 43101 (2012). 11 pages.
Covey, J. P., et al., "Microwave-to-optical conversion via four-wave mixing in a cold ytterbium ensemble," *Phys. Rev.* A100, 012307 (2019). 10 Pages.
Dahmani, Y. D., et al., "Piezoelectric Transduction of a wavelength-Scale Mechanical Waveguide," *Phys. Rev. Appl.* 13,024069(2020). 15 Pages.
Dold, G. et al., "High-Cooperativity Couplingofa Rare-Earth Spin Ensemble to a Superconducting Resonator Using Yttrium Orthosilicate as a substrate," Phys. Rev. Appl. 10, 54082 (2019). 7 Pages.
Dung, H. T., et al., "Local-field correction to the spontaneous decay rate of atoms embedded in bodies of finite size," *Phys. Rev. A* 74,023803 (2006). 12 Pages.
Erickson, L. E., et al., "Nuclear quadrupole resonance measurements ofthe anisotropic magnetic shielding and quadrupole co up ling constants of 151Eu3' and 153Eu3' dilutein YAlO3 single Crystal," *Phys.Rev.*B 24,3697-3700 (Oct. 1, 1981). 5 Pages.
Fan, L. et al., "Superconductingcavity electro-optics: A platform for coherent photon conversion between superconducting and photonic circuits," *Sci. Adv.* 4, eaar4994 (2018). 7 pages.
Fernandez-Gonzalvo, X., et al., "Cavity enhanced Raman heterodyne spectroscopy in Er3+:Y2SiO5 formicrowaveto optical signal conversion," arXiv:1712.07735v1 (Dec. 22, 2017). 7 Pages.
Fernandez-Gonzalvo, X., et al., "Cavity enhanced Raman heterodynespectroscopy in Er3+:Y2SiO5 for microwave to optical signal conversion," *CLEO Pacific Rim*, 2018. 3 Pages.
Fernandez-Gonzalvo, X. et al., "Coherent Frequency Conversion from microwave to Optical Fields in an Erbium Doped Y2SiO5 Crystal: Towards the SinglePhoton Regime," Dissertation presented to the University of Otago, Department of Physics, Feb. 2017. 180 Pages.
Fernandez-Gonzalvo, X., et al., "Coherent frequency up-conversion of microwaves to the optical telecommunications band in an Er: YSO crystal," *Phys. Rev. A* 92, 062373(2015). 8 Pages.
Güindoğan, M., et al., "Solid State Spin-Wave Quantum Memory for Time-Bin Qubits," Physical Review Letters 114, 230501 (2015). 6 Pages.
Hedges, M. P., et al., "Efficient quantum memory for light," Nature 465, 1052-1056. Jun. 24, 2010. 6 Pages.
Higginbotham, A. P., et al. "Harnessing electro-optic correlationsin an efficient mechanical converter," *Nat. Phys.* 14, 1038-1042 (Oct. 2018). 7 Pages.
Hisatomi, R. et al., "Bidirectional conversion between microwave and light via ferromagnetic Magnons," Phys.Rev. B 93, 174427 (2016). 14 Pages.
Jobez, P. et al., "Coherent Spin Control at the Quantum Level in an Ensemble-Based Optical Memory," *Phys. Rev. Lett.*114, 230502 (Jun. 15, 2015). 6 Pages.
Kindem, J. M., et al., "Coherent control and single-shot readout o fa rare-earth ion embedded in a nanophotonic cavity," + Supplementary Materials. Arxiv Prepr. arXiv1907.12161 (2019). 37 pages.
Lambert, N. J., et al., "Coherent Conversion Between Microwave and Optical Photons—An Overview of Physical Implementations," Adv. Quantum Technol. 3, 1900077 (2020). 16 Pages.
Lauk, N. et al., "Perspectives on quantum transduction," QuantumSci. Technol. 5, 020501 (2020). 16 Pages.
Ledingham, P. M., et al., "Experimental Realization of Light with Time-Separated Correlations by Rephasing Amplified Spontaneous Emission," *Phys. Rev. Lett.* 109, 093602 (Aug. 31, 2012). 6 Pages.
O'Brien, C., et al., "Interfacing superconducting qubits and telecomphotons via a rare-earth-doped crystal," Phys. Rev. Lett. 113, 1-5, (2014). 6 pages.
Rueda, A., et al., "Efficient microwaveto optical photon conversion: an electro-optical realization," *Optica* 3, 597 (2016). 9 Pages.
Schuurmans, F. J. P., et al., "Local-field effects on spontaneous emission of impurity atoms in homogeneous dielectrics," Phys. Lett. A 264, 472-477 (Jan. 10, 2000). 7 Pages.
Tiranov, A. et al., "Spectroscopic study of hyperfine properties in 171Yb3+:Y2SiO5," Phys.Rev.B 98, 195110 (Nov. 8, 2018). 13 Pages.
Vainsencher, A., et al., "Bi-directional conversion between microwave and optical frequencies in a piezoelectric optomechanical device," Appl. Phys. Lett. 109, 033107 (Jul. 20, 2016). 6 Pages.
Welinski, S. et al., "Electron Spin Coherence in Rare-Earth Optically Excited States for Microwave to Optical Quantum Transducers," Phys. Rev.Lett. 122, 247401 (2018). 7 Pages.
Yamaguchi, M., et al., "Mapping of site distribution in Eu3+: YAlO3 on RF-optical frequency axes by using double-resonance spectroscopy," *J. Lumin.* 76, 681-684 (1998). 5 Pages.
A. Ortu et al., "Simultaneous coherence enhancement of optical and microwave transitions in solid-stateelectronicspins," Nature Materials 17, 671-675 (2018).
Abobeih M. H. et al., "One-second coherence for a single electron spin coupled to a multi-qubit nuclear-spin environment." Nat. Commun. 9, 1-8 (2018).
Awschalom D. D. et al., "Quantum technologies with optically interfaced solid-state spins." Nat. Photonics. 12, 516-527 (2018).
B. Car et al., "Selective Optical Addressing of Nuclear Spins through Superhyperfine Interaction in Rare-Earth Doped Solids," Physical Review Letters 120, 1-6 (2018).
Bartholomew et al., "ON-chip coherent microwave-to-optical transduction mediated by ytterbium in YVO4" *Institute for Quantum Information and Matter*,33 pages.
Bernien H. et al., "Heralded entanglement between solid-state qubits separated by three metres." Nature. 497, 86-90 (2013).
Clark R. "Quantum Frequency Conversion for Ytterbium Ion Based Quantum Repeaters" Department of Electrical and Computer Engineering, 2012, 55 pages.
Covey J. P. et al., "Telecom-band quantum optics with ytterbium atoms and silicon nanophotonics" Phys. Rev., Oct. 2018, 12 pages.

(56) References Cited

OTHER PUBLICATIONS

Ł. Cywiński et al., "Howto enhancedephasing time in superconducting qubits," Physical Review B—Condensed Matterand Materials Physics 77, 1-11 (2008).
D. L. McAuslan et al., "Reducing decoherence in optical and spin transitions in rare-earth-metal-ion-doped materials," Physical Review A 85, 032339 (2012).
De Lange G. et al., "Universal Dynamical Decoupling of a single solid-state spin from spin bath" Science. 330, 60-64 (2010).
Dibos A. M. et al., "Atomic source of single photons in the telecom band" Phys. Rev. Lett. 120, 243601 (2018).
E. Z. Cruzeiro et al., "Spectral hole lifetimes and spin population relaxation dynamicsin neodymiumdo ped yttrium orthosilicate," Physical Review B 95, 205119 (2017).
F. Marsili et al., "Detecting single infrared photons with 93% system efficiency," Nature Photonics 7, 210-214 (2013).
G. Sallen et al., "Subnano second spectral diffusion measurement using photon correlation," Nature Photonics 4, 696-699 (2010).
Harvey-Collard P. "High-fidelity single-shot read out for a spin qubit via an enhanced latching mechanism" *Phys. Rev.*,Dec. 2017, 15 pages.
Hensen B. et al., "Loophole-free Bell inequality violation using electron spins separated by 1.3 kilometers." Nature. 526, 682-686 (2015).
Hopper D. A. et al., "Spin Readout Techniques of the Nitrogen—Vacancy Centerin Diamond" Micromachines, Aug. 2018, 30 pages.
Humphreys P. C. et al., "Deterministic delivery of remote entanglement on aquantum network." Nature. 558, 268-273 (2018).
J. M. Kindem et al., "Characterization of 171 Yb 3 + : YVO 4 forphotonicquantum technologies," Phys. Rev. B 80, 1-10 (2018).
J. Medford et al., "Scaling of Dynamical Decoupling for Spin Qubits," Physical Review Letters 108, 086802 (2012).
Keith D. et al. "Benchmarking high fidelity single-shot read out of semiconductor qubits" New Journal of Physics, Jun. 2019, 19 pages.
Kimble H. J. "Thequantum internet" Nature. 453, 1023-1030 (2008).
Klauder J. R. et al., "Spectral diffusion decay in spin resonance experiments." Phys Rev. 125 (1961).
Koehl W. F. et al., "Room temperature coherent control of defect spin qubits in silicon carbide" Nature. 479, p. 84, (2011).
Kolesov R. et al., "Optical detection ofasingle rare-earth ion in a crystal." Nat. Commun. 3. 1029 (2012).
L. Robledo et al., "Control and Coherence of the Optical Transition of Single Nitrogen Vacancy Centers in Diamond," Physical Review Letters 177403, 1-4 (2010).
Mallet F. "Single-shotqubit readout in circuitquantum electrodynamics" Nature Physics, Sep. 2009, 5 pages.
N. Zhao et al., "Sensing single remote nuclear spins," Nature Nanotechnology 7, 657-662 (2012).
Purcell E. M. et al., "Spontaneous emission probabilities at radio frequencies." Phys. Rev. 69, 681 (1946).
R. M. Macfarlane, "Optical Stark spectroscopy of solids," Journal of Luminescence 125, 156-174 (2007).
Reiserer A. et al., "Cavity-based quantum networks with single atoms and optical photons" Reviews of Modem Physics, vol. 87, Dec. 2015, 40 pages.
S. C. Kitson et al., "Intensity fluctuation spectroscopy of small numbers of dye molecules in a microcavity," Physical Review A—Atomic, Molecular, and Optical Physics 58, 620-627 (1998).
S. Kolkowitz et al., "Sensing distant nuclear spins with a single electron spin," Physical Review Letters 109, 1-5 (2012).
S. Meiboom et al., "Modified Spin Echo Method for Measuring Nuclear Relaxation Times,", 688 (1958).
S. Mosor et al., "Scanning a photonic crystal slab nanocavity by condensation of xenon," Applied Physics Letter 87, 10-13 (2005).
S. Welinski et al., "Effects of disorderon optical and electron spin linewidths in Er3+ ,Sc 3+ :Y 2 SiO 5," Optical Materials 63, 69-75 (2017).
Sipahigil A. et al., "An integrated diamond nanophotonics platform for quantum-optical networks." Science, 354, 847-850 (2016).
Sukachev D. D. et al., "Silicon-Vacancy Spin Qubitin Diamond: A Quantum Memory Exceeding 10 ms with Single-Shot State Read out." 223602, 1-6 (2017).
Sun. S. et al., "A single-photon switch and transistor enabled by a solid-state quantum memory" Science, 361, 57-60 (2018).
Suter D. et al., "Protecting quantum information against environmental noise" Rev. Mod. Phys. 88, 1-10 (2018).
T. Böttger et al., "Optical decoherence and spectral diffusion at 1.5 µm in Er3+: Y2 SiO5 versus magnetic field,temperature, and Er3+ concentration," Physical Review B 73, 075101 (2006).
T. G. Tiecke et al., "Nano photonic quantum phase switch with a single atom," Nature 508, 241-244 (2014).
T. Gullion et al., "New, compensated Carr-Purcell sequences," Journal of Magnetic Resonance (1969) 89, 479-484 (1990).
T. H. Taminiau et al., "Detection and Control of Individual Nuclear Spins Using a Weakly Coupled Electron Spin," Physical Review Letters 109, 137602 (2012).
T. Zhong et al., "High quality factor nano photonic resonators in bulk rare-earth doped crystals," Optics Express 24, 536 (2016).
U. Ranon, "Paramagnetic resonance of Nd3+, Dy3+, Er3+ and Yb3+ inYVO4," Physics Letters A 28, 228-229 (1968).
Utikal T. et al., "Spectroscopic detection and state preparation of a single praseodymium ion in a crystal." Nat. Commun. 5, 3627 (2014).
V. V. Dobrovitski et al., "Decay of Rabi oscillations by dipolar—coupled dynamicalspin environments," Physical Review Letters 102, 1-4 (2009).
Wehner S. et al., "Quantum internet: A vision for the road ahead." Science, 362 (2018).
Wesenberg J. H. et al., "Scalable designs for quantum computing with rare-earth-ion-doped crystals" Physical Review, vol. 75, Jan. 2007, 7 pages.
Williamson L. A. et al., "Magneto-Optic modulator with unitquantum efficiency." Phys. Rev. Lett. 113, 203601 (2014).
Zhong M. et al., "Optically addressable nuclear spins in a solid with a six-hour coherence time." Nature. 517, 177-180 (2015).
Zhong M. et al., "Quantum information processing using frozen core Y3+ spins in Eu3+: Y2 SiO5." New J. Phys. 21, 033019 (2019).
Zhong T. et al., "Nanophotonic rare-earth quantum memory with optically controlled retrieval." Science, 357, 1392-1395 (2017).
Zhong T. et al., "Optically addressing single rare-earth ionsin a nano photonic cavity." Phys. Rev. Lett. 121, 183603 (2018).

\* cited by examiner

OPTICAL QUANTUM NETWORKS WITH RARE-EARTH IONS

CROSS REFERENCE TO RELATED APPLICATIONS

The present application claims priority to and the benefit of co-pending U.S. provisional patent application Ser. No. 62/878,976 entitled "Optical Quantum Networks with Rare-Earth Ions", filed on Jul. 26, 2019, the disclosure of which is incorporated herein by reference in its entirety.

STATEMENT OF GOVERNMENT GRANT

This invention was made with government support under Grant Nos. PHY1820790, ECCS1454607, and PHY1733907 awarded by the National Science Foundation and under Grant No. FA9550-15-1-0029 awarded by the Air Force. The government has certain rights in the invention.

TECHNICAL FIELD

The present disclosure relates to systems and methods for providing optical quantum communication networks based on single rare-earth ion quantum bits (qubits) entrapped in solids. In particular, qubits may be provided by single ytterbium 171 ($^{171}$Yb$^{3+}$) ions that are doped into a crystal structure, such as yttrium orthovanadate (YVO) crystal structure ($^{171}$Yb$^{3+}$:YVO).

BACKGROUND

Quantum networks, as exemplified in FIG. 5, in which quantum nodes for processing and storing quantum information are connected by quantum channels (like optical fibers), have emerged as a route to building scalable and flexible quantum-enhanced technologies that can make use of relatively elementary quantum systems currently available. Optical photons are excellent carriers of quantum information and the ideal candidate for establishing long-distance, room-temperature links between quantum nodes. The challenge lies in finding a way to map information efficiently and reversibly from light (photons) into quantum nodes where it can be stored and processed. The development of such quantum light-matter interfaces is then of vital importance to the successful implementation of a quantum network.

Among the wide variety of approaches and platforms that have been developed toward this goal, solid-state spins with optical transitions offer a promising route to robust and scalable light-matter interfaces. There are many different optically-addressable solid-state spins currently being investigated for this application, including quantum dots, color centers in diamond or silicon carbide, donors in silicon, and rare-earth ions in solids.

In order for a solid-state quantum emitter to be useful in the context of a quantum network, it must have long spin coherence (millisecond or longer) lifetimes to enable storage of quantum information and spectrally stable optical transitions to enable the generation of indistinguishable photons necessary for entanglement generation. To enable the efficient extraction of emitted photons into a well-defined optical mode, these emitters should be coupled to optical cavities or resonators. Crucially, the emitters must maintain their desired spin and optical properties when integrated into these cavities. Finding a system that can satisfy these requirements is a fundamental challenge in the field of solid-state quantum emitters. Teachings according to the present disclosure address such challenge.

Rare-earth ions (REIs) doped into crystalline hosts have demonstrated significant progress in implementing solid-state quantum technologies. REIs possess some of the longest optical lifetimes (millisecond) and spin coherence lifetimes (hours) in the solid state, which has provided the foundation for numerous demonstrations of quantum memories and quantum interfaces. For interfaces involving both microwave and optical photons, REIs with an odd number of electrons (i.e. Kramers ions), such as erbium, neodymium, and ytterbium, are of interest due to their electron spin transitions. The large magnetic moments of these ions allow for strong interactions with microwaves, enabling fast operations and the potential for interfacing with superconducting qubits. Isotopes of these ions with non-zero nuclear spin also offer the possibility of long-term quantum storage. This combination of properties creates the potential for building interfaces between microwave photons, optical photons, and long-lived nuclear spins.

Among the Kramers ions, ytterbium (Yb) is an attractive choice due to its simple level structure consisting of only two electronic multiplets (respectively labelled in FIG. 1A as $^2F_{7/2}$ having lower energy levels used as ground state, and $^2F_{5/2}$ having higher energy levels used as excited state). The optical transition between the lowest energy levels of these multiplets occurs around 980 nm (e.g., FIG. 1A later described), which is readily accessible by laser sources such as standard diode lasers. Furthermore, the $^{171}$Yb$^{3+}$ isotope is unique among the trivalent REIs as the only Kramers ion with a nuclear spin of ½. This gives the simplest possible hyperfine energy structure with both electron and nuclear spin degrees of freedom, which reduces the complexity of optical preparation and manipulation of spin states. Furthermore, the electron spin could be used to efficiently interface with microwave photons, while the nuclear spin offers the possibility of long-term storage. Recent work in Yb$^{3+}$:LiNbO$^3$, Yb$^{3+}$:YAG, and Yb$^{3+}$:YSO highlights the interest in this ion.

Doping of $^{171}$Yb$^{3+}$ in yttrium orthovanadate (YVO$_4$, or YVO) is an especially attractive choice for implementing quantum interfaces due to the ability to fabricate nanoscale devices and the high site symmetry in this material. Yttrium orthovanadate (YVO) is a uniaxial crystal in which a Y$^{3+}$ ion (labelled as Y in FIG. 1F) sits at a site of D$_{2d}$ symmetry. As shown in FIG. 1E, in the crystal host YVO, a $^{171}$Yb$^{3+}$ ion directly substitutes for a Y$^{3+}$ ion in a site that has non-polar symmetry (D$_{2d}$), which results in no first-order DC stark effect and thus reduces the sensitivity to electric field fluctuations that can cause optical decoherence. The coupling of electronic and nuclear spin at zero applied magnetic field gives rise to states that are first-order insensitive to magnetic field fluctuations that can induce decoherence. Furthermore, the transition between these energy levels retains the strength of an electron spin transition, which enables fast and efficient microwave manipulation. Recent surveys of the properties of the optical and nuclear spin transitions of ensembles of $^{171}$Yb$^{3+}$:YVO ions at cryogenic temperatures have shown that this material has strong optical transitions compared to other REI-doped materials, a simple resolved energy level structure, and long optical and spin coherence lifetimes. Teachings according to the present disclosure are enabled by such unique properties of $^{171}$Yb$^{3+}$.

SUMMARY

According to a first aspect of the present disclosure, a rare-earth based quantum bit (qubit) is presented, the qubit comprising: a doped crystal ($^{171}$Yb$^{3+}$:YVO) comprising a ytterbium 171 ($^{171}$Yb$^{3+}$) ion doped into a yttrium orthovanadate (YVO) host crystal; a nanophotonic cavity coupled to the doped crystal; first and second laser sources coupled to the $^{171}$Yb$^{3+}$ ion through the nanophotonic cavity; and first and second microwave sources coupled to the $^{171}$Yb$^{3+}$ ion through a microwave waveguide, wherein: a zero-field energy level structure of the rare-earth qubit provided by the $^{171}$Yb$^{3+}$ ion comprises: optical transitions between lower energy level ground states and higher energy level excited states, the optical transitions addressable via optical pulses generated by the first and second laser sources, and first and second microwave transitions within respective ground states and excited states, the first microwave transition addressable via microwave pulses generated by the first microwave source, and the second microwave transition addressable via microwave pulses generated by the second microwave source.

According to a second aspect of the present disclosure, a rare-earth based quantum bit (qubit) is presented, the qubit comprising: a doped crystal comprising a ytterbium 171 ($^{171}$Yb$^{3+}$) ion doped into a host crystal; a nanophotonic cavity fabricated in the doped crystal; wherein: a zero-field energy level structure of the rare-earth qubit provided by the $^{171}$Yb$^{3+}$ ion comprises: optical transitions between lower energy level ground states and higher energy level excited states, the optical transitions addressable via optical pulses, and first and second microwave transitions within respective ground states and excited states, the first microwave and second microwave transitions addressable via microwave pulses.

According to a third aspect of the present disclosure, a method for realizing a rare-earth based quantum bit (qubit) is presented, the method comprising: doping a ytterbium 171 ($^{171}$Yb$^{3+}$) ion into a yttrium orthovanadate (YVO) host crystal, thereby obtaining a doped crystal (171Yb$^{3+}$:YVO); fabricating a nanophotonic cavity in the doped crystal; based on the doping, obtaining a zero-field energy level structure of the rare-earth qubit provided by the $^{171}$Yb$^{3+}$ ion, said structure comprising: i) optical transitions A, E and F between lower energy level ground states and higher energy level excited states at a wavelength that is longer than 980 nm; and ii) microwave transitions $f_g$ and $f_e$ within respective ground states and excited states; addressing the optical transitions via optical pulses generated by first and second laser sources coupled to the 171Yb3+ ion through the nanophotonic cavity, and addressing the microwave transition $f_g$ via microwave pulses generated by a first microwave source coupled to the $^{171}$Yb$^{3+}$ ion through the nanophotonic cavity; and addressing the microwave transition $f_e$ via microwave pulses generated by a second microwave source coupled to the $^{171}$Yb$^{3+}$ ion through the nanophotonic cavity.

Further aspects of the disclosure are shown in the specification, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure. Same reference designators refer to same features.

DETAILED DESCRIPTION

To implement quantum networks based on single optical photon emitters (e.g., qubit), it may be necessary to isolate the photon emission from a single ion and control and readout the spin state of this ion. Specifically, spin-spin entanglement between distant rare-earth ions (REIs) may first require spin-photon entanglement between a single REI and an optical photon. In turn, such spin-photon entanglement may require the ability to excite and collect the emission from a single ion (i.e., REI) without collecting photons from other ions that are part of a crystal structure (e.g., YVO) within which the REI is entrapped. This entails isolating a single emitter either in the spatial or frequency domain. Further, it requires the ability to prepare or initialize the spin state of the REI into a specific state and then coherently manipulate this spin state (i.e., such as to preserve spin coherence of the REI). It also requires the ability to read out the state of the ion in a single instance with high-fidelity.

A central challenge with building REI-based quantum interfaces is that their exceptional coherence properties come at the expense of weak optical transitions. The slow optical photon emission and collection rate from a single rare-earth ion in a bulk crystal makes it difficult to optically identify and isolate a corresponding signature from the background emission rate with high signal-to-noise ratio. As a result, most REI-based interfaces to date have relied on the collective absorption of large ensembles of REIs to achieve efficient interaction with light and thereby allowing detection of a corresponding (collective) signature.

Figure 5:
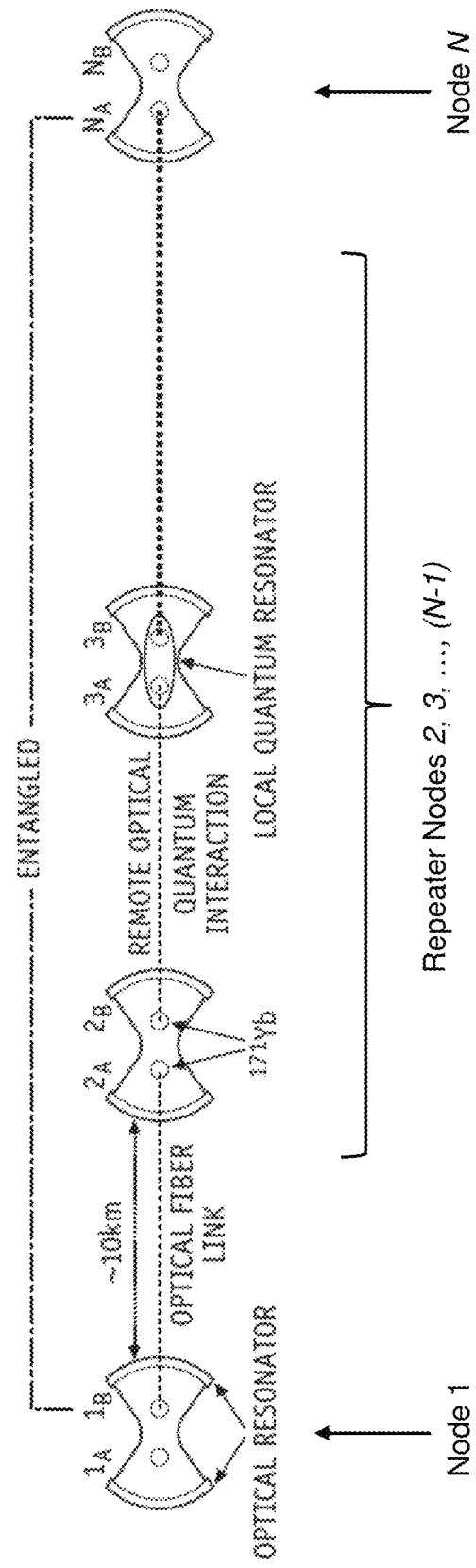
FIG. 5 shows a schematic of an exemplary optical quantum network for entangling a first node to a last node.

Teachings according to the present disclosure overcome the above challenges with REI-based interfaces by coupling ytterbium ($^{171}$Yb$^{3+}$) ions to a nanophotonic cavity (i.e., nanophotonic resonator). This allows overcoming the relatively weak optical transitions of the REIs ($^{171}$Yb$^{3+}$) and enable detection and coherent manipulation of a single ytterbium ion which can therefore be used, for example, as a single optical photon emitter in a node of a quantum network as shown in FIG. 5 (later described).

According to an embodiment of the present disclosure, the $^{171}$Yb$^{3+}$ ions are coupled to a photonic (crystal) cavity by fabricating such cavity in an, e.g., YVO host crystal that is doped with the $^{171}$Yb$^{3+}$ ions. According to an exemplary embodiment, the $^{171}$Yb$^{3+}$ ions concentration relative to the host crystal is around 20 parts per billion with respect to yttrium (e.g., Y of the host crystal shown in FIG. 1E). Furthermore, such cavity can be fabricated to provide a relatively small optical mode volume (e.g., about ~1($\lambda$/$n_{YVO}$)$^3$) and a large quality factor (e.g., 1×10$^4$ or higher), thereby increasing the cavity quality factor to mode volume ratio. This in turn enhances the emission rate, collection efficiency, and cyclicity of optical transitions (e.g., transition A and E described with reference to FIG. 1A) emitted by the REI via, for example, the known in the art Purcell effect.

Figure 1A:
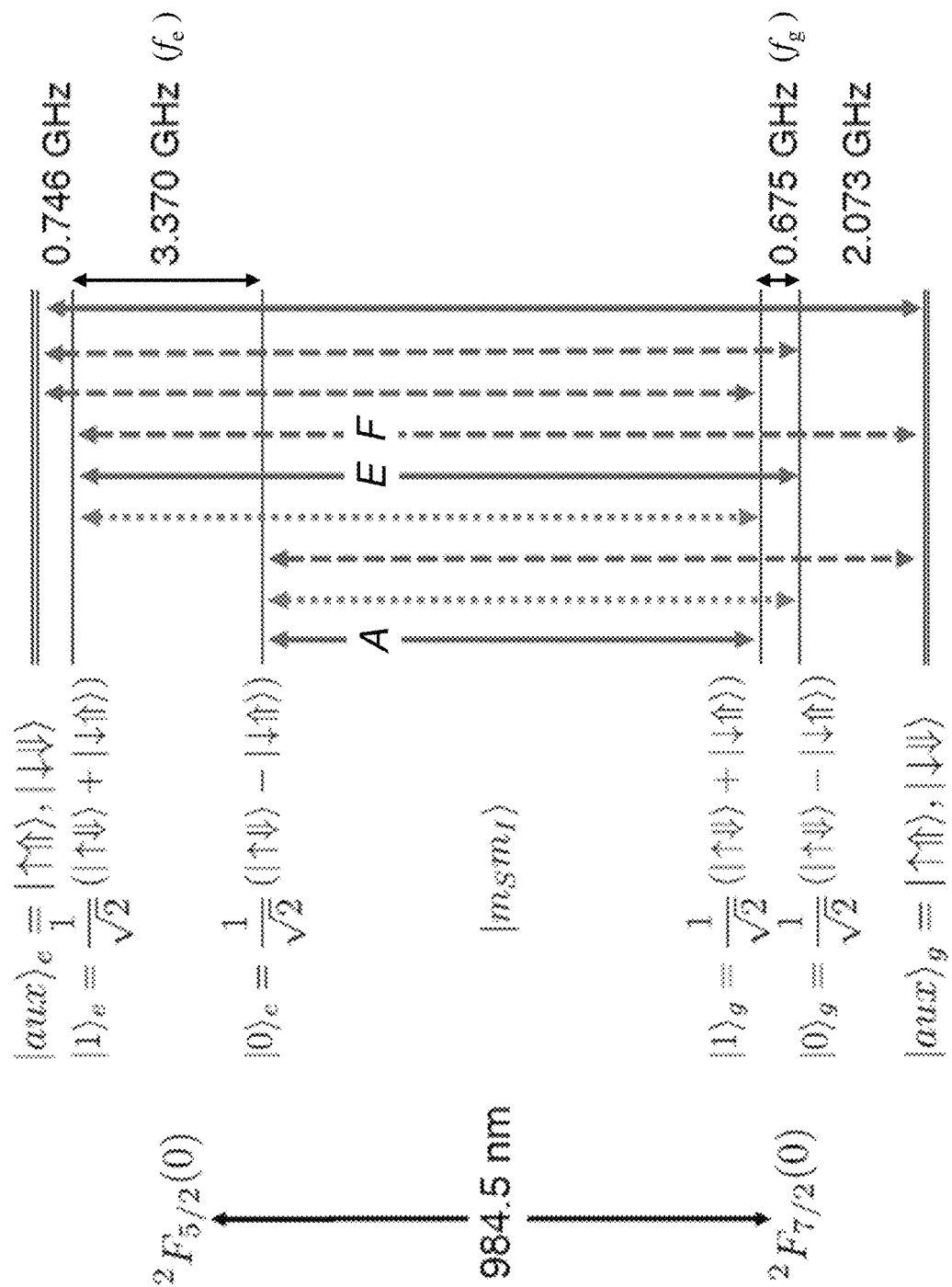
FIG. 1A shows a zero-field energy level structure of a qubit provided by a $^{171}$Yb$^{3+}$ ion doped into a yttrium orthovanadate (YVO) crystal structure ($^{171}$Yb$^{3+}$:YVO).

FIG. 1A shows a zero-field energy level structure of a qubit provided by a 171Yb$^{3+}$ ion coupled to the photonic cavity according to the present disclosure. Optical transitions A and E are coupled (co-polarized) to the cavity mode, while the transition F is cross-polarized to the cavity mode. The relatively large hyperfine interaction by the level structure shown in FIG. 1A means that the three optical transitions (A, E, F) can be easily resolved in an optical transmission spectrum through the cavity at zero magnetic field. As can be seen in FIG. 1A, the optical transitions (emissions) A, E and F are associated with transitions between various spin states labelled as $|aux\rangle_g$, $|0\rangle_g$, $|1\rangle_g$, $|0\rangle_e$, and $|1\rangle_e$ at zero magnetic field, wherein "g" stands for ground and "e" for excited. It is noted that as can be clearly seen in FIG. 1A, other transitions (not labelled in FIG. 1A) between the various labelled states do exist, some such transitions being possible only with a non-zero magnetic field. It should be noted that addressing of the three transitions (A, E, F) of the zero-field energy level structure shown in FIG. 1A and obtaining excitation results according to the present teachings is only possible at zero magnetic field. In other words, care is taken to eliminate any coupling of magnetic fields to the $^{171}$Yb$^{3+}$ ion, including any stray magnetic field, such as to obtain a true "zero-field".

With continued reference to FIG. 1A, it is noted that spin states are denoted according to the form:

$$|0\rangle_g = \frac{|\downarrow \Uparrow\rangle - |\uparrow \Downarrow\rangle}{\sqrt{2}}, |1\rangle_g = \frac{|\downarrow \Uparrow\rangle + |\uparrow \Downarrow\rangle}{\sqrt{2}}, \text{ and } |aux\rangle_g = |\uparrow \Uparrow\rangle, |\downarrow \Downarrow\rangle.$$

where the electron spin is denoted $$|\uparrow\rangle = |S_z = \frac{1}{2}\rangle, |\downarrow\rangle = |S_z = -\frac{1}{2}\rangle$$

as and the nuclear spin is denoted as $$|\Uparrow\rangle = |I_z = \frac{1}{2}\rangle, |\Downarrow\rangle = |I_z = -\frac{1}{2}\rangle.$$

Figure 1B:
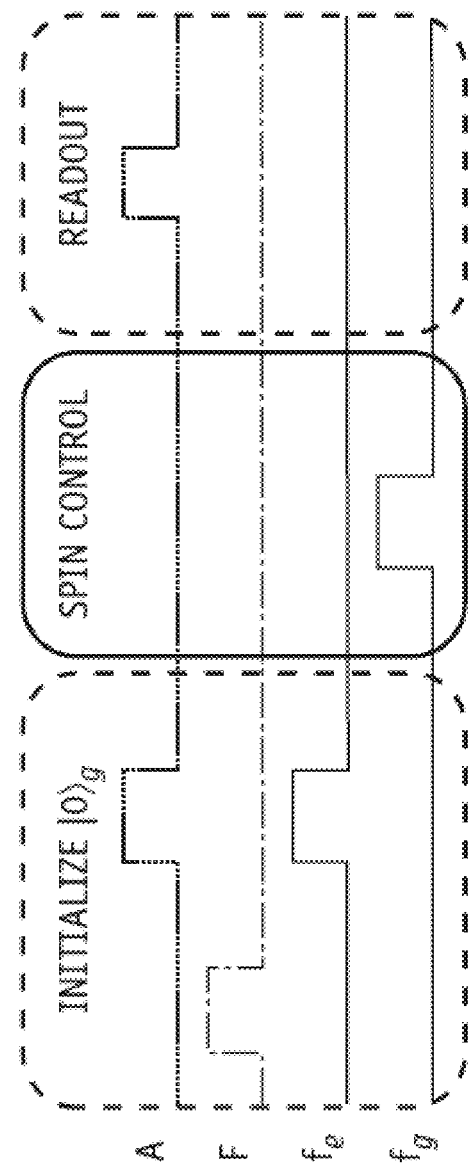
FIG. 1B shows an exemplary sequence according to the present disclosure used to initialize the qubit of FIG. 1A into a state $|0\rangle_g$, manipulate the spin state of the qubit, and optically read out the spin state of the qubit.

As noted above, the unique properties of $^{171}$Yb$^{3+}$, the only paramagnetic rare-earth isotope with a nuclear spin of ½, provides a favourable combination of the simple hyperfine structure shown in FIG. 1A, which can be used as a qubit and clock transitions with long coherence times. Furthermore, as shown in FIG. 1E, in the crystal host YVO, $^{171}$Yb$^{3+}$ directly substitutes for Y$^{3+}$ in a site that has non-polar symmetry ($D_{2d}$), which results in no first-order DC stark effect and thus reduces the sensitivity to electric field fluctuations that can cause optical decoherence.

With further reference to FIG. 1A, the $|0\rangle_g$ and $|1\rangle_g$ spin states have zero net magnetic moment and as a result the $|0\rangle_g \leftrightarrow |1\rangle_g$ transition is first-order insensitive to magnetic field fluctuations that are known to induce decoherence. This in turn allows for optical linewidths less than 1 MHz and spin coherence times excessing 30 milliseconds (ms) for the cavity coupled $^{171}$Yb$^{3+}$ ions (even at temperatures greater than 1 K). The $|0\rangle_g \leftrightarrow |1\rangle_g$ transition retains the strength of an electron spin transition, which enables fast and efficient microwave manipulation. Teachings according to the present disclosure use states $|0\rangle_g$ and $|1\rangle_g$, which are separated by a frequency $f_g$~675 MHz (i.e., difference in energy between the two states), to form the spin qubit.

With continued reference to FIG. 1A, it should be noted that the shown zero-field energy level structure of the qubit according to the present disclosure can be provided at temperatures greater than 1K (Kelvin). A person skilled in the art will appreciate practical aspect of operation according to such relatively high (hot) temperature which can be achieved using relatively common cryostats based on helium 4 that is an abundant resource. Lower (colder) temperatures generally require helium 3 that is produced in nuclear reactors and is orders of magnitude more expensive than helium 4.

The cavity-enhanced optical transitions provided by the coupled $^{171}$Yb$^{3+}$ ions according to the present teachings, enable coherent optical control and efficient spin initialization of the qubit. As shown in FIG. 1B, the qubit is initialized into spin state $|1\rangle_g$ by optical and microwave pumping, through e.g. laser and microwave sources, on F, A, and $f_e$ to empty $|aux\rangle_g$ and $|1\rangle_g$ (and fill $|1\rangle_e$). Once in the excited state $|1\rangle_e$, the ion decays by the cavity-enhanced transition E (shown in FIG. 1A) with high probability to $|0\rangle_g$. As shown in FIG. 1B, the spin state can be controlled via a subsequent microwave π pulse applied, through a microwave source, on $f_g$ to optionally initialize the ion into spin state $|1\rangle_g$. Finally, as shown in FIG. 1B, the $|1\rangle_g$ state population can be read out by excitation on A and collection of the resulting ion fluorescence. As known to a person skilled in the art, "pumping" refers to repeated optical excitation and decay, such that the atom/ion ends in a different state (e.g., per FIG. 1A). In other words, pumping refers to doing something to the atom/ion (e.g., apply lasers and microwaves pulses according to the present teachings) in order to make the atom/ion go in some specific state. It is called "pumping" because historically the atom/ion (or multiple atoms/ions) was excited to a higher energy state, such as to pump it up.

Figure 1C:
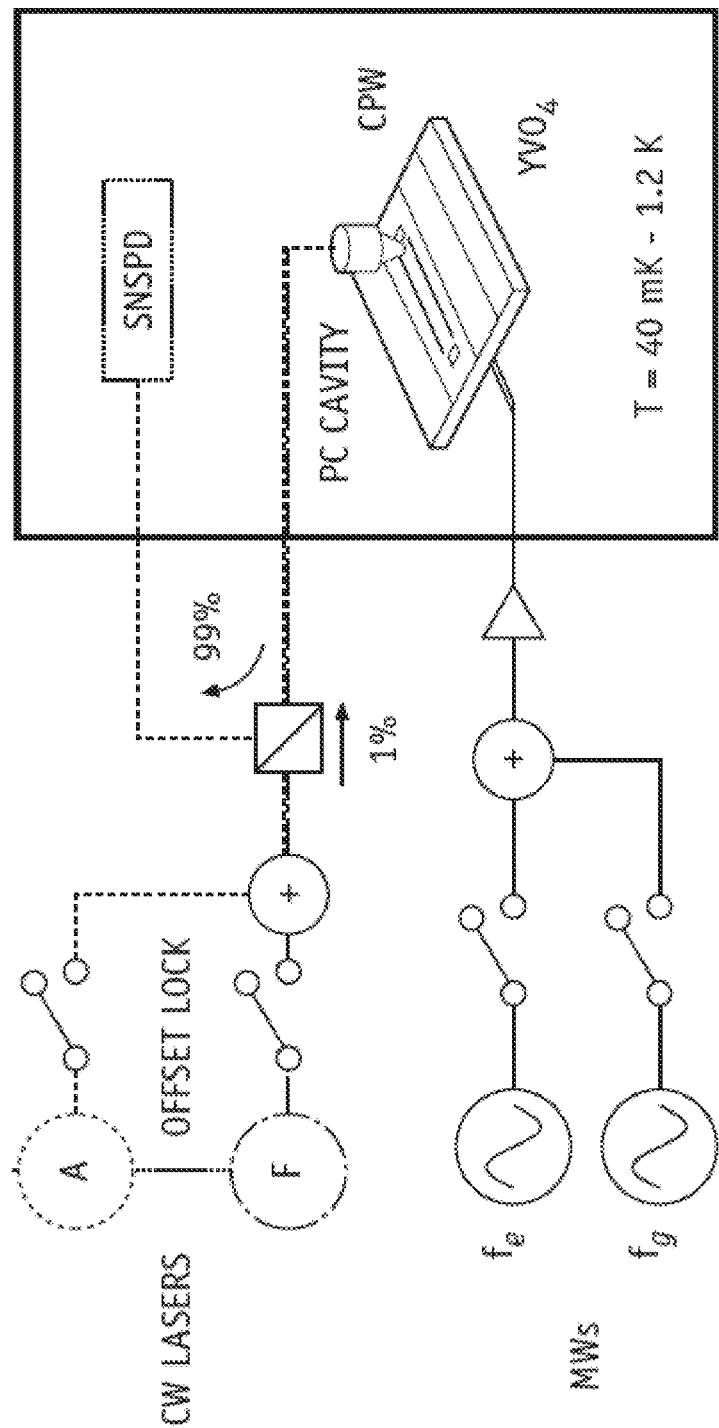
FIG. 1C shows a block diagram according to an exemplary embodiment of the present disclosure used to operate the qubit according to the sequence of FIG. 1B.

FIG. 1C shows a block diagram according to an exemplary embodiment of the present disclosure used to operate the qubit according to the sequence of FIG. 1B. Transitions A and F of the $^{171}$Yb$^{3+}$ ions are optically addressed/pumped using two laser source such as frequency-stabilized continuous-wave (CW) lasers coupled into the nanophotonic cavity (labelled PC CAVITY in FIG. 1C), while a microwave coplanar waveguide (CPW) fabricated next to the nanocavity allows for driving/pumping of the spin transitions $f_e$ (i.e., $|0\rangle_e \rightarrow |1\rangle_e$) and $f_g$ (i.e., $|0\rangle_g \rightarrow |1\rangle_g$) at microwave (MW) frequencies.

As shown in FIG. 1C, coupling of the CW lasers (optical pumping) and the MW frequencies (microwave pumping) to the cavity and the waveguide can be provided selectively via respective switches. According to an exemplary embodiment, each CW laser source may be independently amplitude-modulated using two free-space acousto-optic modulators (AOMs, not shown in the figure). The CW lasers may be coupled into an optical fiber and combined using a fiber-based 99/1 beam splitter before being directed to the cavity. Light reflected or emitted from the cavity may be directed by the 99/1 beam splitter for emission to a next stage (e.g., a node of a quantum network), or as shown in FIG. 1C, for detection by, for example, a superconducting nanowire single photon detector (SNSPD) for analyzing of the emitted light. It should be noted that generation of light and microwave signals shown in FIG. 1C may be provided via separate sources operating at different frequencies/wavelengths, or via a single source that can selectively operate according to one of at least two frequencies/wavelengths. For example, excitation of transitions A and F may be provided by a single laser source that can be tuned (or switched) to the corresponding output wavelengths quickly enough to output a desired sequence of pulses within a desired time period. Same may apply to excitation of transitions $f_e$ and $f_g$ at corresponding microwave frequencies.

Figure 1D:
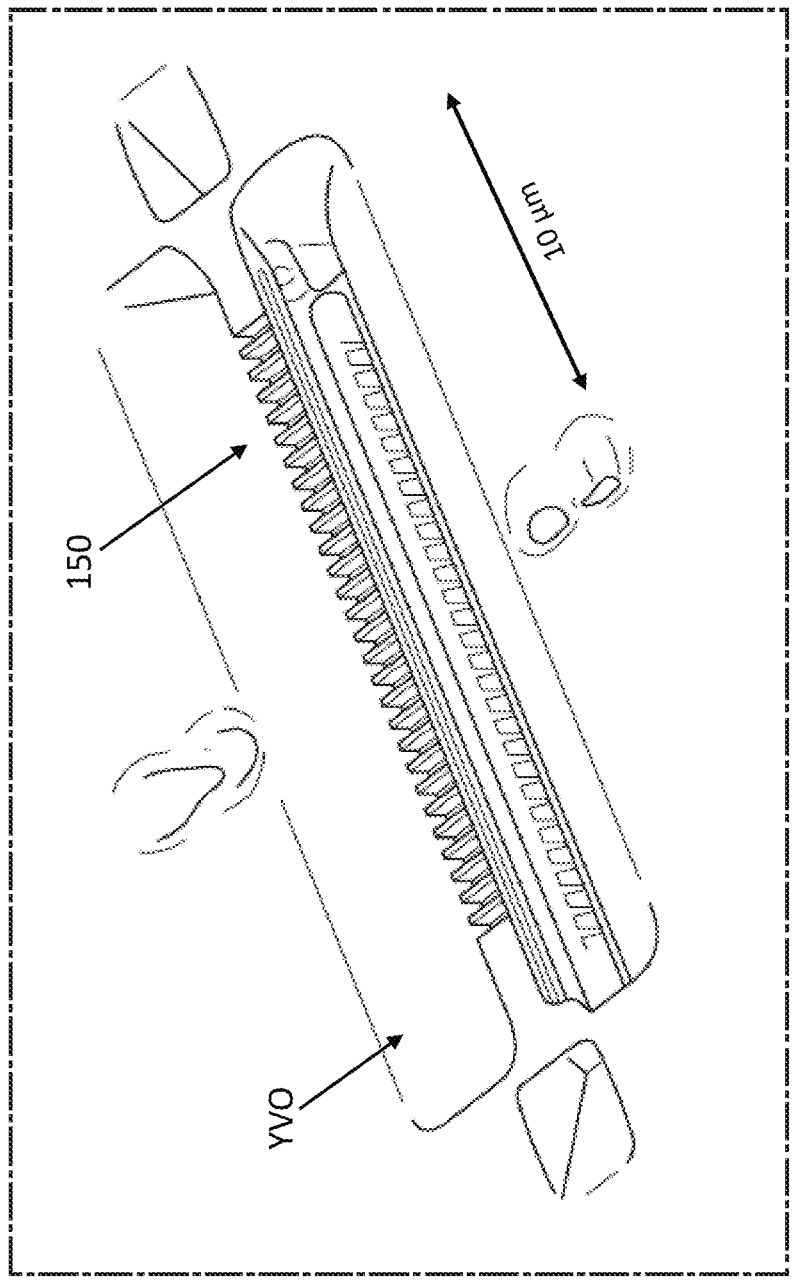
FIG. 1D shows a line drawing based on a scanning electron microscope (SEM) image of a photonic crystal cavity fabricated in a YVO crystal structure doped by single $^{171}$Yb$^{3+}$ ions.
Figure 1E:
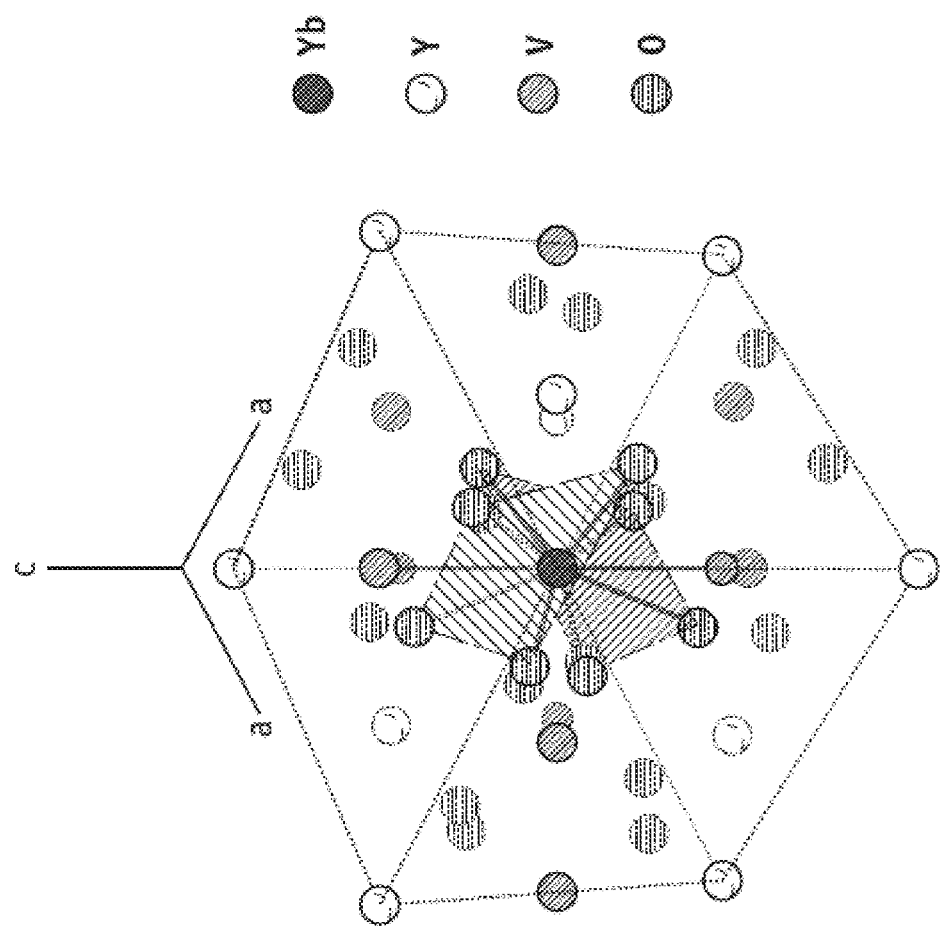
FIG. 1E shows a single $^{171}$Yb$^{3+}$ ion doped into a yttrium orthovanadate (YVO) crystal structure ($^{171}$Yb$^{3+}$:YVO).

FIG. 1D shows a line drawing based on a scanning electron microscope (SEM) image of a photonic crystal cavity fabricated in a YVO crystal structure doped by single $^{171}$Yb$^{3+}$ ions. As shown in the embedded scale indication, the entire structure can have, in a longitudinal direction of a ladder-like structure (150), a length of about 20 μm to 30 μm. Also, as can be seen in FIG. 1D, the ladder-like structure (150) is fabricated (milled) into the YVO crystal structure that is doped with $^{171}$Yb$^{3+}$ ions. The CW laser beams travel along the longitudinal direction of the ladder-like structure (150), and couple to a 171Yb$^{3+}$ ion embedded within the YVO crystal structure. On the other hand, the microwaves are much larger than the ladder-like structure (150) and therefore the entire ladder-like structure (150) is surrounded by the microwaves, which therefore couple to the $^{171}$Yb$^{3+}$ ion. It should be noted that given the relatively small size of the ladder-like structure (150) and the relatively small doping of $^{171}$Yb$^{3+}$ ions embedded within the YVO crystal structure that make the ladder-like structure (150), there may be a few tens of $^{171}$Yb$^{3+}$ ions randomly distributed in the structure (150). It should be noted that the cavity may not necessarily be fabricated within the doped crystal. Rather, the cavity may, for example, be fabricated in a different material and placed adjacent (coupled) to the doped crystal, such as, for example, on top of the doped crystal.

Figure 2A:
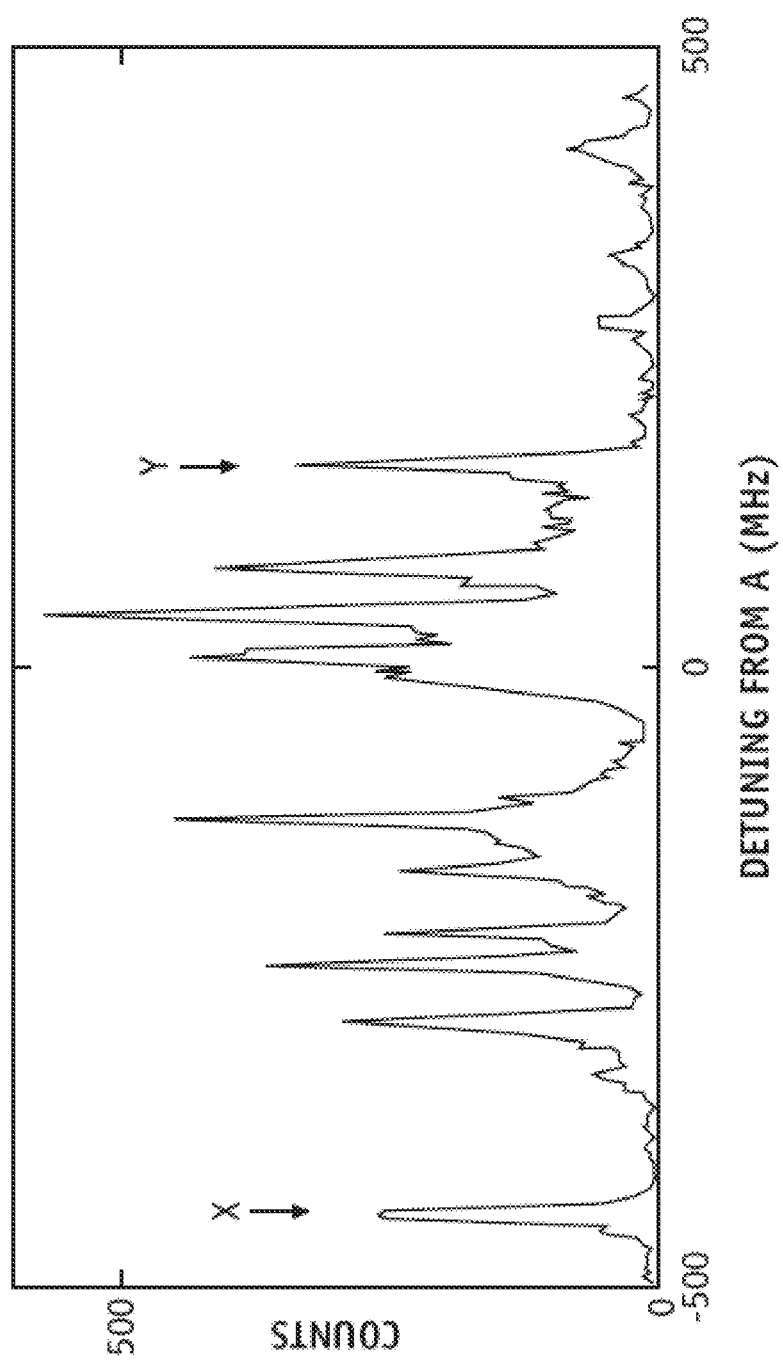
FIG. 2A shows a graph representative of a photoluminescence excitation (PLE) spectrum showing resolved peaks corresponding to single $^{171}$Yb$^{3+}$ ions doped in the (YVO) crystal structure ($^{171}$Yb$^{3+}$:YVO).
Figure 2B:
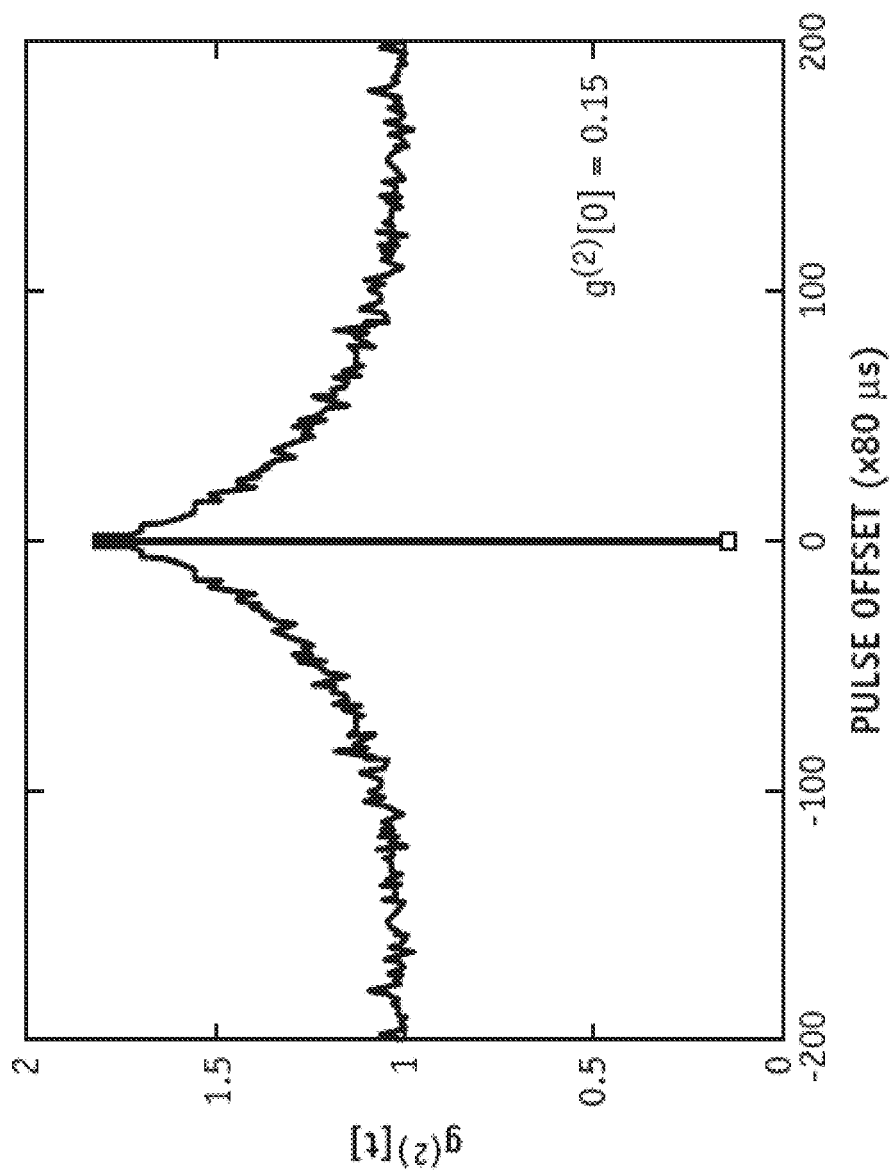
FIG. 2B shows a graph representative of a pulsed autocorrelation measurement on the ion X shown in FIG. 2A.

FIG. 2A shows a graph representative of a photoluminescence excitation (PLE) spectrum showing resolved peaks (e.g., labelled X and Y) corresponding to a single $^{171}$Yb$^{3+}$ ion doped in the (YVO) crystal structure ($^{171}$Yb$^{3+}$:YVO) obtained on transition A. The PLE scan of FIG. 2A shows peaks in fluorescence that Applicant has confirmed to originate from emission of a single $^{171}$Yb$^{3+}$ ion by measuring the pulse-wise second-order photon correlation of the resonant emission of which a representative graph is shown in FIG. 2B (e.g., as applied at the resolved peak X of FIG. 2A). As shown in FIG. 2B, for the ion marked X in FIG. 2A, a second-order correlation value of $g^{(2)}[0]=0.15\pm0.01$ is observed. It is noted that a value of $g^{(2)}[0] \ll 0.5$ confirms the single emitter nature of the observed fluorescence.

Figure 2C:
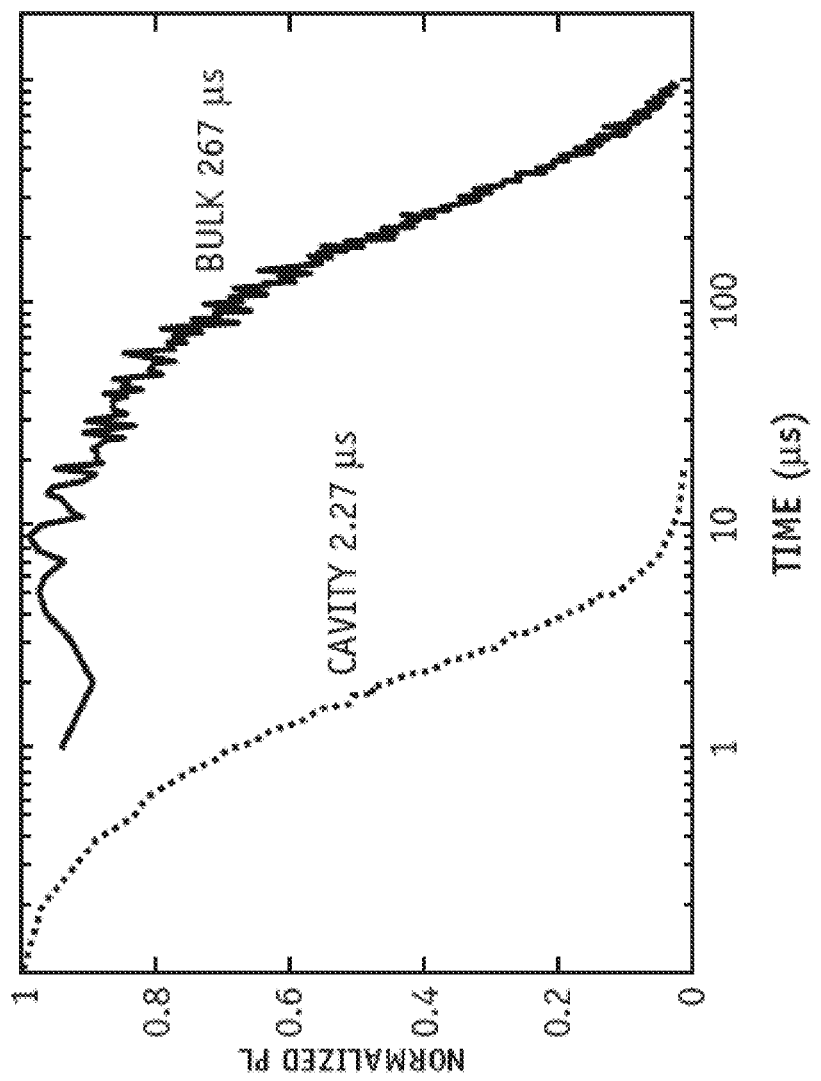
FIG. 2C shows a graph representative of a normalised photoluminescence emission from the ion X of FIG. 2A compared to typical photoluminescence from ions in bulk crystal.

FIG. 2C shows a graph representative of a normalised photoluminescence (PL) emission from the ion X of FIG. 2A compared to typical photoluminescence emission from ions in bulk crystal. As can be seen in FIG. 2C, an optical lifetime of $T_1=2.27$ μs is measured for ion X, which is a reduction from an optical lifetime (267 μs) of similar ions in bulk crystal by a factor $\beta F_p=117$ (wherein $\beta=0.35$ is the branching ratio for emission via A, and $F_p$ is the Purcell factor). It would be clear to a person skilled in the art that such reduction in optical lifetime as provided by the present teachings can allow an increase in achievable photon emission rates.

Figure 3A:
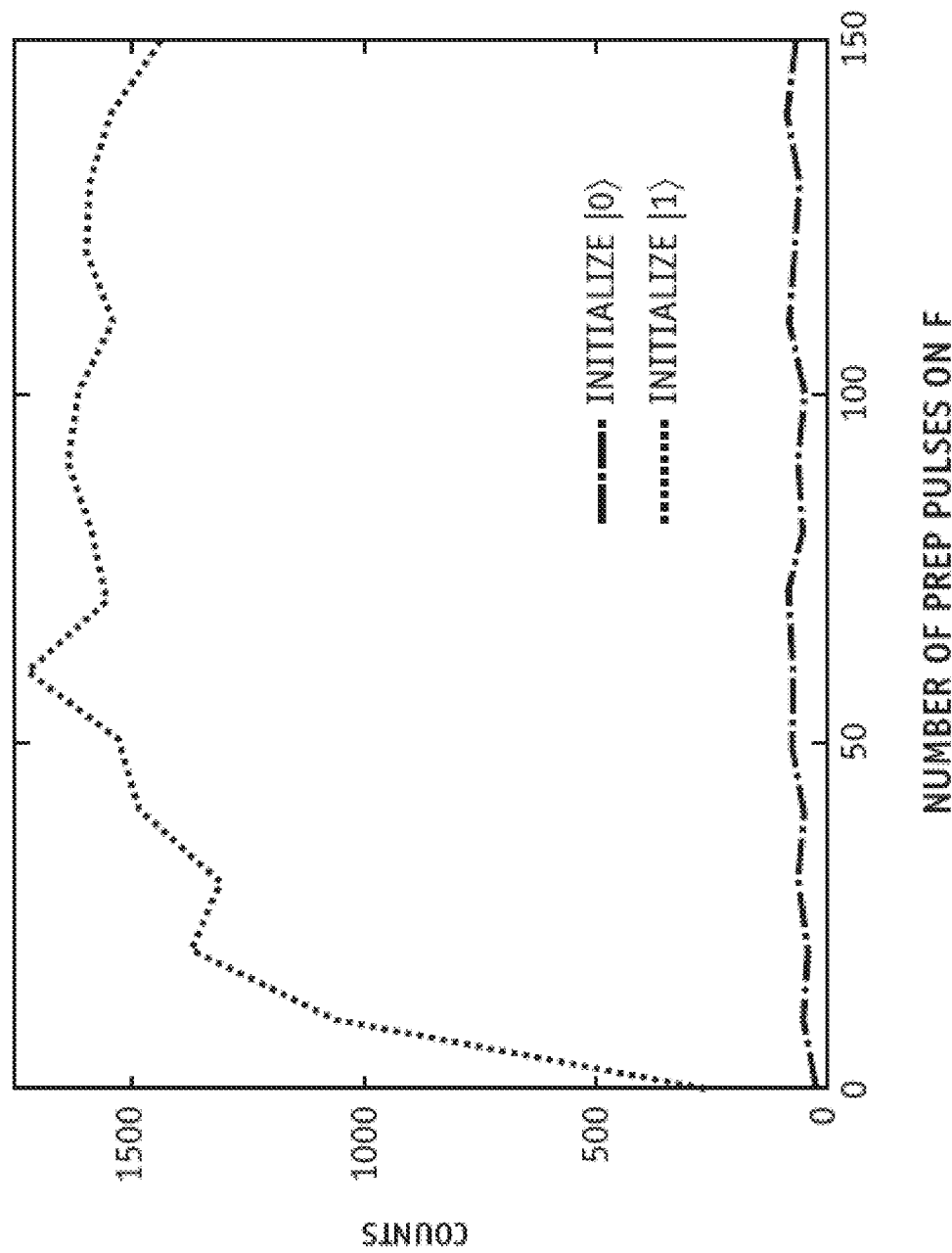
FIG. 3A shows graphs representative of the probability of finding the $^{171}$Yb$^{3+}$ ion in either spin state $|0\rangle_g$ and spin state $|1\rangle_g$, proportional to the number of counts in the photoluminescence excitation after the preparation pulses on transition F shown in FIG. 1A used for (state) initialization into qubit subspace that includes spin state $|0\rangle_g$ and spin state $|1\rangle_g$.

To demonstrate and assess the quality of the spin state initialization scheme (e.g., FIG. 1B) for the qubit accord to the present disclosure, the population in spin state $|0\rangle_g$ and $|1\approx\rangle_g$ is measured per FIG. 1B (e.g., using PLE with a series of optical pulses, including optical π pulses in a case of spin state $|1\rangle_g$, on transition A) for varying lengths of (preparation) pulses. FIG. 3A shows graphs representative of optimization of optical pumping out of the $|aux\rangle_g$ state (and into qubit subspace $|0\rangle_g$ and $|1\rangle_g$) by varying the number of pulses on F while keeping the number of initialization pulses on A+$f_e$ fixed at 100. From the observed count rate, optical branching ratio and detection efficiency, the initialization into the qubit subspace is estimated to be 95%.

Figure 3B:
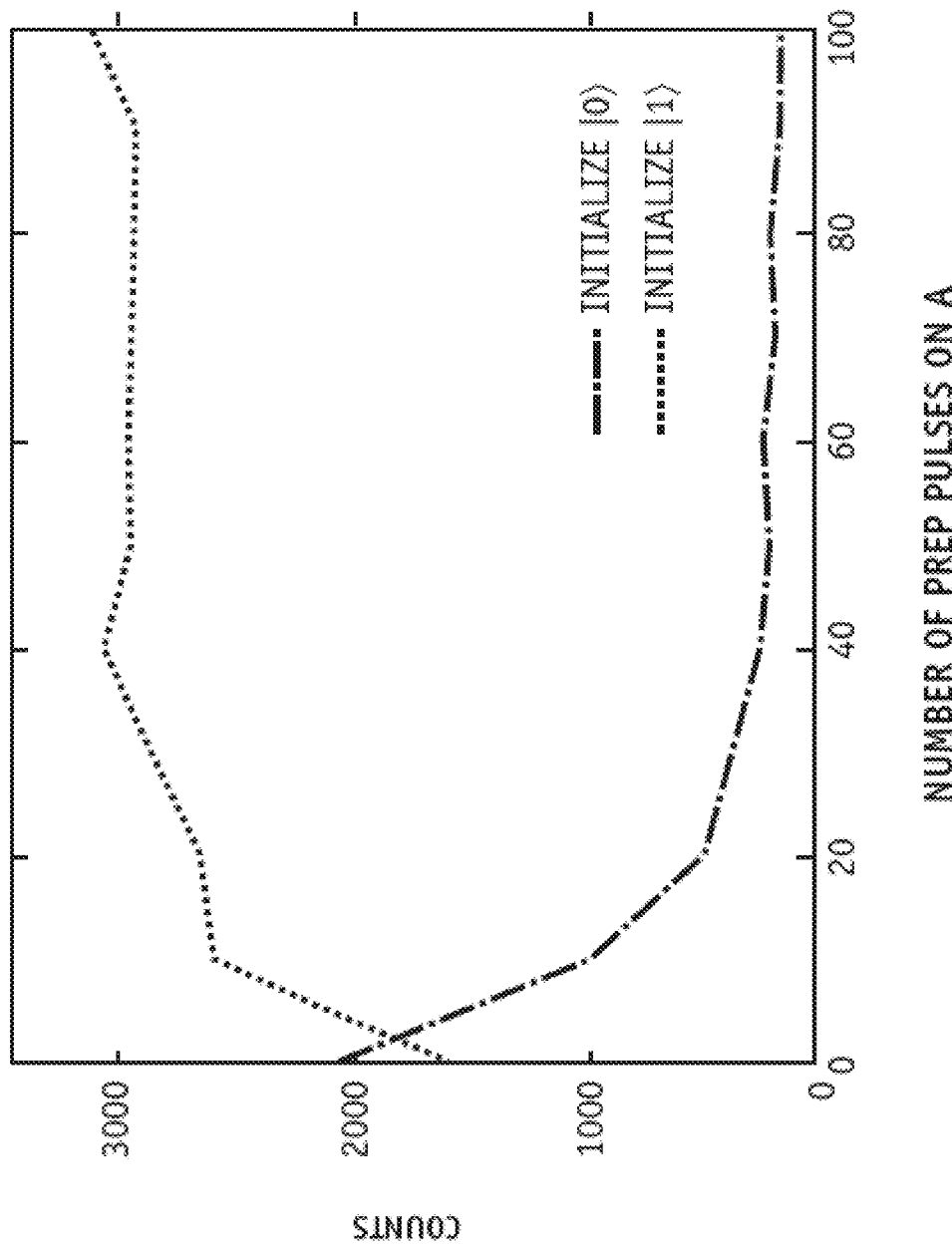
FIG. 3B shows graphs representative of the probability of finding the $^{171}$Yb$^{3+}$ ion in either spin state $|b\,0\rangle_g$ and spin state $|1\rangle_g$, proportional to the number of counts in the photoluminescence excitation after the preparation pulses on transition A shown in FIG. 1A used for (state) initialization into qubit subspace that includes spin state $|0\rangle_g$ and spin state $|1\rangle_g$.

On the other hand, FIG. 3B shows graphs representative of initialization into spin states $|1\approx\rangle_g$ or $|0\approx\rangle_g$ as the number of pulses on A+$f_e$ is increased while holding the number of pulses on F fixed at 150. Without any subtraction of background count contributions, a population contrast of 91% is observed, which corresponds to an initialization fidelity of 96% within the qubit subspace. This demonstrates that this pumping scheme according to the present teachings allows for efficient initialization between the two spin states $|0\rangle_g$ and $|1\rangle_g$ in under 500 μs when considering (optical) pumping that includes, for example, 2.5 μs long pulses with repetition rates of about 100-200 kHz.

Figure 4A:
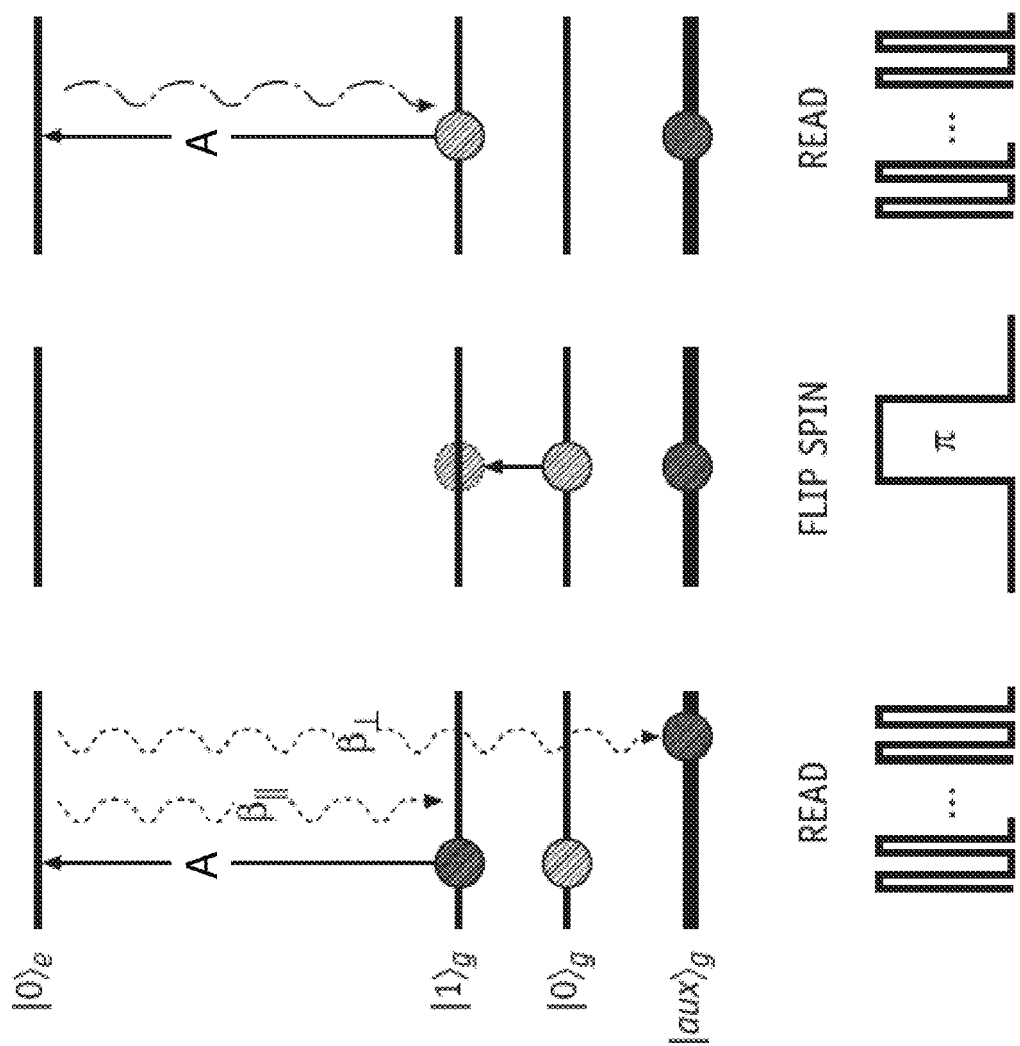
FIG. 4A shows a single-shot readout (SSRO) sequence according to an embodiment of the present disclosure of a single $^{171}$Yb$^{3+}$ ion doped into a yttrium orthovanadate (YVO) crystal structure ($^{171}$Yb$^{3+}$:YVO).

To harness the relatively long spin coherence time of the cavity coupled $^{171}$Yb$^{3+}$ ions-based qubit according to the present teachings, for use for example, in quantum networks, it is essential to read out the qubit state in a single measurement (also known as single-shot readout, SSRO). FIG. 4A shows a single-shot readout (SSRO) sequence according to an embodiment of the present disclosure used for the cavity coupled $^{171}$Yb$^{3+}$ ions-based qubit. As can be seen in FIG. 4A, the SSRO sequence according to the present teachings includes two consecutive optical read periods (each labelled as Read) on transition A separated by a microwave π pulse (i.e., $f_g$ of FIGS. 1A, 1B) to invert (flip) the qubit population (e.g., from spin state $|0\rangle_g$ to spin state $|1\rangle_g$).

As known to a person skilled in the art, single shot may refer to a procedure by which the qubit is first prepared, and then it is read out. On the other hand, when the prepare and readout sequences are repeated multiple times to obtain a value of the qubit, then the readout sequence may not be a single shot readout. In other words, a SSRO is provided in one single shot or run of an experiment, as opposed to averaging over many initialization/readout sequences.

As known to a person skilled in the art, a π (Pi) pulse may refer to a pulse of light (e.g., laser) or microwaves generally resonant with a transition between two levels, the pulse being calibrated via known methods to move the population/excitation fully from one level to another. Accordingly, an optical π pulse is a π pulse in the optical (e.g., visible) domain/frequencies, and a microwave π pulse is a π pulse in the microwave domain/frequencies. For example, with reference to FIG. 1A, microwave pulses, including microwave π pulses, can move population/excitations between levels labeled either as "g" or as "e", but not between "g" and "e". On the other hand, optical pulses, including optical π pulses, can move population/excitations between levels labeled "g" and "e" but not between levels that have the same label (g or e). It should be noted that a π pulse can move (transfer) population/excitations with a probability of 1, whereas as non-Pi pulse, can transfer population/excitations with some probability between 0 and 1, and not necessarily 1.

As known to a person skilled in the art, a transition strength (and thus power needed to drive, for example, a π (pi) pulse) may be defined for a given polarization of the light. Different transitions may have "preferred" polarizations and may be most efficiently addressed when aligned (co-polarized) to the cavity. When co-polarized to the cavity, pulses can be more efficient in transferring the population/excitations. In principle π pulses can be either co-polarized or cross-polarized, but the co-polarized ones can be more efficient to implement (i.e., may require less optical power).

With continued reference to FIG. 4A, the SSRO sequence according to the present teachings takes into consideration that, for the cavity coupled $^{171}Yb^{3+}$ ions-based qubit, direct resonant photoluminescence (PL) readout of the qubit spin state can most efficiently be performed using a series of optical π pulses on transition A. As shown in FIG. 4A, during the first optical read period/sequence, the $^{171}Yb^{3+}$ ion is repeatedly excited using optical π pulses on transition A and the resulting fluorescence is collected. An $^{171}Yb^{3+}$ ion in spin state $|1\rangle_g$ will return (decay) to $|1\rangle_g$ with branching ratio (e.g., rate) $\beta_\|$ before eventually being pumped to the spin state $|aux\rangle_g$, while an ion in spin state $|0\rangle_g$ will be largely unaffected by the readout. A microwave π pulse (i.e., $f_g$ of FIGS. 1A, 1B) is then applied to the spin transition to invert (flip) the population of $|0\rangle_g$ and $|1\rangle_g$, and the ion is optically read out again via a second optical read period/sequence. The spin state of the $^{171}Yb^{3+}$ ion is assigned based on the number of photons detected in the first and second read sequences (e.g., FIG. 4B). It should be noted that parameters $\beta_\|$ and $\beta_\perp$ shown in FIG. 4A, also referred to as branching ratios, are parameters that are proportional to the probability of the $^{171}Yb^{3+}$ ion decay from the spin state $|0\rangle_e$ to spin state $|1\rangle_g$ and spin state $|aux\rangle_g$ respectively.

With continued reference to FIG. 4A, it should be noted that the Purcell-enhanced cyclicity of transition A (labelled as $\beta_\|$ in FIG. 4A, with $\beta_\| > 99.6\%$) allows for multiple photon emitting cycles before the ion is optically pumped out of the qubit subspace into the spin state $|aux\rangle_g$, (noting that $|0\rangle_e \rightarrow |0\rangle_g$ is forbidden at zero-field). In this context, cyclicity describes the probability that an excited ion will return to its original ground state upon emission of a photon. High cyclicity is essential for single-shot readout in which the qubit state is assigned based on the number of photons detected during repeated optical excitation of the ion.

Figure 4B:
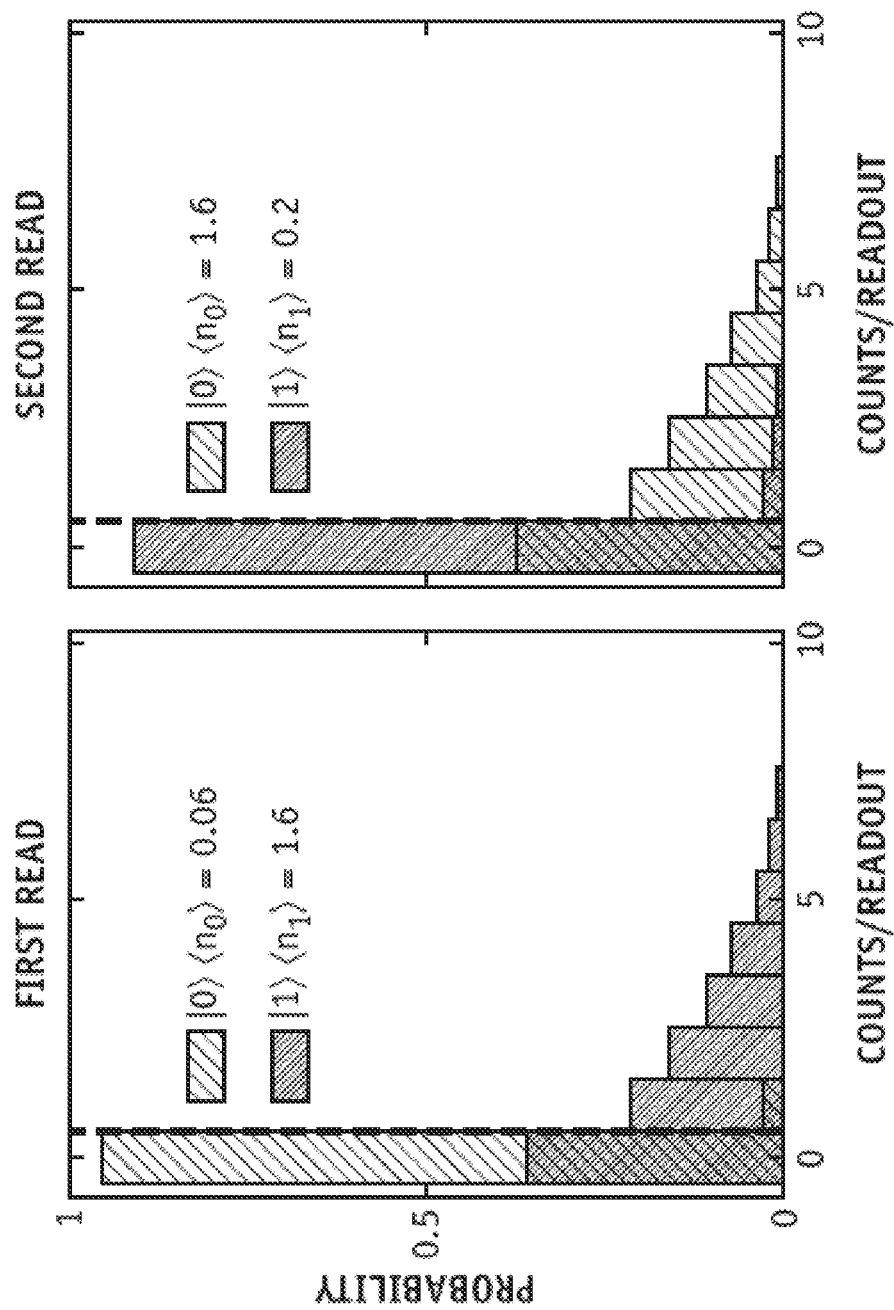
FIG. 4B shows graphs representative of photon-count distributions for first and second read sequences used in the SSRO of FIG. 4A for the $^{171}$Yb$^{3+}$ ion initially prepared in the spin state $|0\rangle_g$ or in the spin state $|1\rangle_g$.

FIG. 4B shows graphs representative of photon-count distributions for the first and second read sequences used in the SSRO of FIG. 4A for the $^{171}Yb^{3+}$ ion initially prepared (initialized) in the spin state $|0\rangle_g$ or in the spin state $|1\rangle_g$. Photon-count distribution as shown in FIG. 4B is used to assign spin state based on a threshold count of 1 photon (indicated by the dashed line in FIG. 4B). In other words, a spin state of $|1\rangle_g$ is assigned if a count of 1photon is observed, and a spin state of $|0\rangle_g$ is assigned if a count of 0 photons is observed. FIG. 4B shows the resulting photon count histograms in which 400 read pulses were used per sequence (each of the first and second read sequences), showing good agreement with the expected form (i.e., per the initialized state) for the photon count distributions, and therefore good readout fidelity.

Based on the readout fidelity observed through distributions represented in FIG. 4B, according to an embodiment of the present disclosure, spin state of the (readout) ion can be assigned to: $|1\rangle_g$, if ≥1 photons are measured during the first readout sequence and 0 photons are measured during the second readout sequence; and $|0\rangle_g$ if 0 photons are measured during the first readout sequence and ≥1 photons are measured during the second readout sequence. Results of the measurement can be labelled as where $|ab\rangle$, where a is the outcome of the first readout and b is the outcome of the second readout. Accordingly, the initial state of the $^{171}Yb^{3+}$ ion is conditionally assigned to $|0\rangle_g$ on the observation of $|01\rangle$, and to $|1\rangle_g$ on the observation of $|10\rangle$.

Figure 4C:
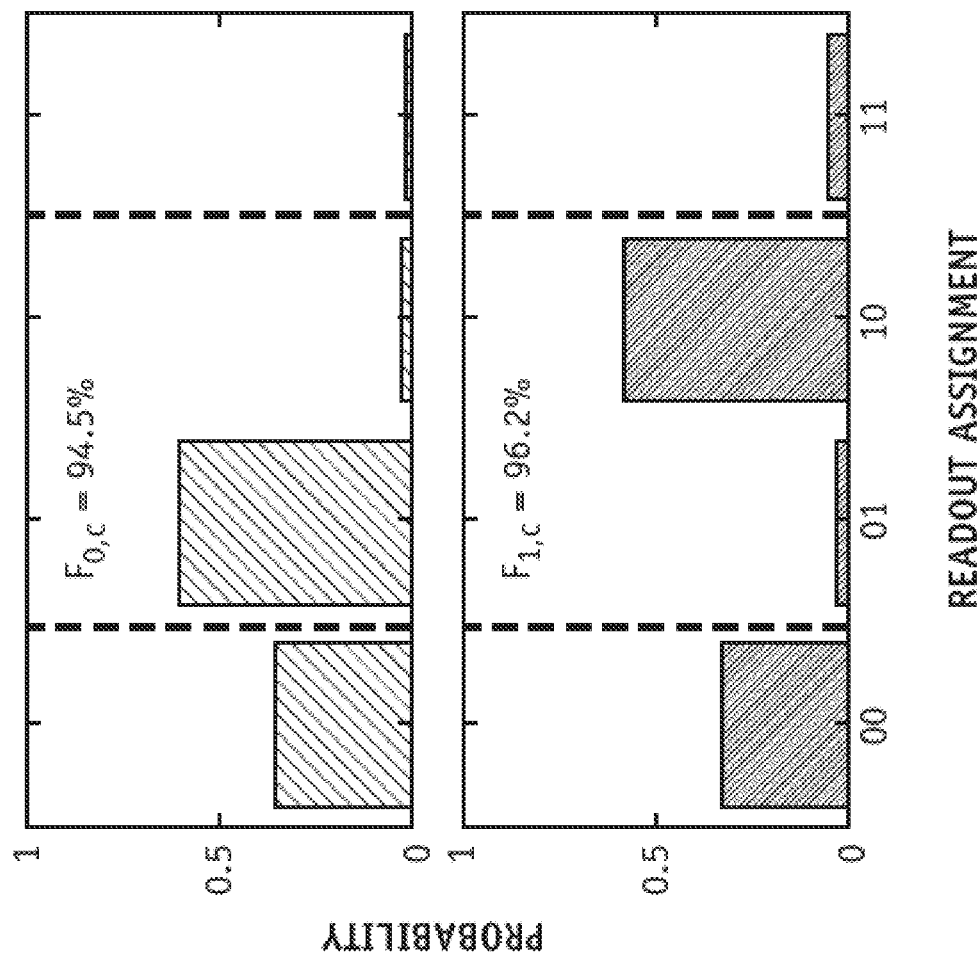
FIG. 4C shows graphs representative of probability distribution of assigned states (i, j) for the first and second read sequences used in the SSRO of FIG. 4A for the $^{171}$Yb$^{3+}$ ion initially prepared in the spin state $|0\rangle_g$ and in the spin state $|1\rangle_g$, where i and j are the states assigned to the first and second read sequences.

Such conditional readout approach can mitigate the effect of photon loss in the detection path, which can limit the fidelity of readout using a single readout sequence (i.e., single series of readout pulses instead of two according to the SSRO of the present teachings). Additionally, this method discriminates between spin states $|0\rangle_g$ and $|aux\rangle_g$ to ensure that the $^{171}Yb^{3+}$ ion was in the qubit subspace (i.e., $|0\rangle_g$, $|1\rangle_g$) prior to the measurement. As shown in FIG. 4C, by implementing this scheme, an average conditional readout fidelity of 95.3±0.2% (average of 94.5% probability for the ion initially prepared in the $|0\rangle_g$ spin state, and 96.2% probability for the ion initially prepared in the $|1\rangle_g$ spin state) can be achieved.

It should be noted that variations of the readout scheme described above with reference to FIGS. 4A-4C can be conceived using other similar sequences of optical and microwave pulses. For example, a readout scheme, according to one exemplary embodiment of the present disclosure, may include a readout on transition A with simultaneous/alternating repumping pulses applied on transition C. This effectively enhances the cyclicity of transition A. In this case, the ion that starts in the spin state $|1\rangle_g$ and decays to the spin state $|aux\rangle_g$ during the readout process, will be repumped into $|1\rangle_g$, and can be readout for an additional amount of time limited by the lifetime of the spin state transitions, for an improved readout fidelity as described below. A readout scheme according to yet another exemplary embodiment of the present disclosure, may include alternating readout on transitions A and E to provide a direct differential readout of states $|0\rangle_g$ and $|1\rangle_g$. This is similar in spirit to the current SSRO sequence described above with reference to FIG. 4A but removes the requirement of a microwave π pulse (Flip Spin per FIG. 4A) on the ground state $|0\rangle_g$ between the two readout sequences.

Furthermore, improvements to the readout fidelity with further Purcell enhancement in higher quality factor cavities and higher collection overall efficiencies may allow for an SSRO based on a single readout. It is important to note that readout according to the present disclosure is made possible by the Purcell enhancement in the cavity, which preferentially enhances emission via the cavity-coupled transitions. In the symmetry of YVO and zero-applied magnetic field, the cavity-coupled transitions (i.e. light polarized along the crystal c-axis shown in FIG. 1E) are spin-preserving. Because these transitions are coupled to and enhanced by the cavity relative to the non-spin preserving transitions, cyclicity of the optical transition is improved, meaning that the $^{171}Yb^{3+}$ ion can be repeatedly excited and its spin state read out via detection of a photon before it decays to a different state.

While the present teachings demonstrate the utility of the enhanced cyclicity in a nanophotonic cavity, further improvements can allow for high unconditional readout fidelities with a single readout sequence. Additional modifications to the SSRO scheme according to the present teachings, such as optically repumping during the readout sequence to further make use of this cavity-enhanced cyclicity, may offer further improved fidelity.

It should be noted that previous work related to use of a $^{171}Yb$ ion in a quantum bit makes use of the $^{171}Yb$ ion in a configuration wherein the ion is trapped in vacuum. In such configuration, energy level structures of the entrapped $^{171}Yb$ ion are completely different from the energy level structure provided by the teachings according to the present disclosure (e.g., FIG. 1A). In other words, use of the transitions between the energy levels shown in FIG. 1A for implementation of the qubit according to the present disclosure requires that the $^{171}Yb^{3+}$ ion be located inside a crystal as described above with reference to FIG. 1E. In crystals there are strong electric fields which allow energy levels of the transitions shown in FIG. 1A. Such energy levels are not allowed for transitions of atoms trapped in vacuum. Furthermore, transitions between the ground levels and the excited levels (shown in FIG. 1A) are at a longer wavelength (e.g., longer than 980 nm or about 984 nm) so that emitted photons during the transitions are more suitable for propagation in optical fibers that are used, for example, in the exemplary quantum network shown in FIG. 5.

FIG. 5 shows a schematic of an exemplary optical quantum network for entangling (i.e., connecting at the quantum level) a first node, Node 1, and a last node, Node N, through one or more intermediary (repeater) nodes, Nodes 2, 3, . . . , (N-1). As can be seen in FIG. 5, each node may comprise two $^{171}Yb^{3+}$ ions (e.g., $2_A$ and $2_B$) coupled to an optical resonator according to a configuration described above. Remote photonic quantum interactions (e.g., at a wavelength of about 984 nm) via optical fiber links connecting the various nodes shown in FIG. 5, can entangle different nodes separated by many kilometers. Local quantum interaction between $^{171}Yb^{3+}$ ions (e.g., $2_A$ and $2_B$) is used to transfer entanglement within a node (e.g., Node 2).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A rare-earth based quantum bit (qubit), comprising:
a doped crystal ($^{171}Yb^{3+}$:YVO) comprising a ytterbium 171 ($^{171}Yb^{3+}$) ion doped into a yttrium orthovanadate (YVO) host crystal;
a nanophotonic cavity coupled to the doped crystal;
first and second laser sources coupled to the $^{171}Yb^{3+}$ ion through the nanophotonic cavity; and
first and second microwave sources coupled to the $^{171}Yb^{3+}$ ion through a microwave waveguide, wherein:
a zero-field energy level structure of the rare-earth qubit provided by the $^{171}Yb^{3+}$ ion comprises:
optical transitions between lower energy level ground states and higher energy level excited states, the optical transitions addressable via optical pulses generated by the first and second laser sources, and
first and second microwave transitions within respective ground states and excited states, the first microwave transition addressable via microwave pulses generated by the first microwave source, and the second microwave transition addressable via microwave pulses generated by the second microwave source.

2. The rare-earth based qubit of claim 1, wherein the optical transitions are at a wavelength that is longer than 980 nm.

3. The rare-earth based qubit of claim 2, wherein a subspace of the qubit is defined by a state $|0\rangle_g$ and a state $|1\rangle_g$ of the lower energy level ground states.

4. The rare-earth based qubit of claim 3, wherein a difference in energy level between the state $|0\rangle_g$ and the state $|1\rangle_g$ is at a frequency of about 675 MHz.

5. The rare-earth based qubit of claim 4, wherein the optical transitions are optical transitions A, E and F and wherein initialization of a state of the qubit into the qubit subspace is provided by optical pumping on optical transition F.

6. The rare-earth based qubit of claim 5, wherein the microwave transitions are microwave transitions $f_g$ and $f_e$ and wherein initialization of the qubit to the state $|0\rangle_g$, while within the qubit subspace, is provided by simultaneous optical pumping on optical transition A and microwave pumping on microwave transition $f_e$.

7. The rare-earth based qubit of claim 6, wherein initialization of the qubit to the state $|1\rangle_g$ from the state $|0\rangle_g$, and vice versa, is provided by microwave pumping on microwave transition $f_g$ via a microwave π pulse.

8. The rare-earth based qubit of claim 7, wherein the qubit is configured for readout according to a single-shot readout sequence comprising:
   a first sequence of optical pumping on the optical transition A via optical π pulses;
   a microwave pumping on the microwave transition $f_g$ via a microwave π pulse; and
   a second sequence of optical pumping on the optical transition A via optical π pulses.

9. The rare-earth based qubit of claim 8, wherein:
   a state of the readout qubit is provided by a conditional readout scheme based on a two-state variable $|ab\rangle$, a representing a first state within the qubit subspace detected via the first sequence, and b representing a second state within the qubit subspace detected via the second sequence, and
   a=0 when the first state detected is $|0\rangle_g$, and a=1 when the first state detected is $|1\rangle_g$, and
   b=0 when the second state detected is $|0\rangle_g$, and b=1 when the second state detected is $|1\rangle_g$.

10. The rare-earth based qubit of claim 9, wherein:
    the first state and the second state are respectively provided by resonant photoluminescence collected on the first sequence and the second sequence.

11. The rare-earth based qubit of claim 10, wherein:
    collection of the resonant photoluminescence is based on emission of a single photon by the $^{171}Yb^{3+}$ ion.

12. The rare-earth based qubit of claim 9, wherein:
    for a value of $|ab\rangle=|01\rangle$, the state of the readout qubit is assigned to $|0\rangle_g$, and
    for a value of $|ab\rangle=|10\rangle$, the state of the readout qubit is assigned to $|1\rangle_g$.

13. The rare-earth based qubit of claim 9, wherein:
    an average conditional readout fidelity of the single-shot readout sequence is greater than 95%.

14. The rare-earth based qubit of claim 1, wherein the optical transitions are optical transitions A, E and F and wherein:
    the optical transitions A and E are co-polarized to a mode of the nanophotonic cavity, and
    the optical transition F is cross-polarized to the mode of the nanophotonic cavity.

15. The rare-earth based qubit of claim 1, wherein:
    said first and second laser sources are provided via a single tunable laser source.

16. The rare-earth based qubit of claim 1, wherein:
    the nanophotonic cavity is fabricated in the doped crystal.

17. A rare-earth based quantum bit (qubit), comprising:
    a doped crystal comprising a ytterbium 171 ($^{171}Yb^{3+}$) ion doped into a host crystal;
    a nanophotonic cavity fabricated in the doped crystal;
    wherein:
    a zero-field energy level structure of the rare-earth qubit provided by the $^{171}Yb^{3+}$ ion comprises:
       optical transitions between lower energy level ground states and higher energy level excited states, the optical transitions addressable via optical pulses, and
       first and second microwave transitions within respective ground states and excited states, the first microwave and second microwave transitions addressable via microwave pulses.

18. A quantum network, comprising:
    a plurality of nodes, each node comprising at least one qubit according to claim 2; and
    a plurality of optical fibers coupling the plurality of the nodes,
    wherein
       entanglement between a first node and a second node of the plurality of nodes is provided via photons emitted at a wavelength longer than 980 nm by the optical transitions between ground states and excited states of a $^{171}Yb^{3+}$ ion of the first node.

19. A method for realizing a rare-earth based quantum bit (qubit), the method comprising:
    doping a ytterbium 171 ($^{171}Yb^{3+}$) ion into a yttrium orthovanadate (YVO) host crystal, thereby obtaining a doped crystal ($^{171}Yb^{3+}$:YVO);
    fabricating a nanophotonic cavity in the doped crystal;
    based on the doping, obtaining a zero-field energy level structure of the rare-earth qubit provided by the $^{171}Yb^{3+}$ ion, said structure comprising:
       i) optical transitions A, E and F between lower energy level ground states and higher energy level excited states at a wavelength that is longer than 980 nm; and
       ii) microwave transitions $f_g$ and $f_e$ within respective ground states and excited states;
    addressing the optical transitions via optical pulses generated by first and second laser sources coupled to the $^{171}Yb^{3+}$ ion through the nanophotonic cavity, and addressing the microwave transition $f_g$ via microwave pulses generated by a first microwave source coupled to the $^{171}Yb^{3+}$ ion through the nanophotonic cavity; and
    addressing the microwave transition $f_e$ via microwave pulses generated by a second microwave source coupled to the $^{171}Yb^{3+}$ ion through the nanophotonic cavity.

20. The method according to claim 19, further comprising:
    initializing of a state of the qubit into a qubit subspace by optical pumping on transition F,
    wherein the qubit subspace is defined by a state $|0\rangle_g$ and a state $|1\rangle_g$ of the lower energy level ground states separated by a frequency of about 675 MHz.

21. The method according to claim 20, further comprising:
    flipping a state of the qubit while within the qubit subspace by simultaneous optical pumping on transition A and microwave pumping on transition $f_e$.

22. The method according to claim 21, further comprising:
    reading out a state of the qubit according to a single-shot readout sequence comprising:
       a first sequence of optical pumping on the optical transition A via optical π pulses;
       a microwave pumping on the microwave transition $f_g$ via a microwave π pulse; and
       a second sequence of optical pumping on the optical transition A via optical π pulses.

23. The method according to claim 22, further comprising:
    implementing a conditional readout scheme based on a two-state variable $|ab\rangle$, a representing a first state within the qubit subspace detected via the first sequence, and b representing a second state within the qubit subspace detected via the second sequence,
    wherein
       a=0 when the first state detected is $|0\rangle_g$, and a=1 when the first state detected is $|1\rangle_g$, and b=0 when the second state detected is $|0\rangle_g$, and b=1 when the second state detected is $|1\rangle_g$; and assigning a state of a readout qubit to $|0\rangle_g$ for a value of $|ab\rangle=|01\rangle$; and assigning a state of a readout qubit to $|1\rangle_g$ for a value of $|ab\rangle=|10\rangle$.

\* \* \* \* \*